US012634889B2

(12) United States Patent
Murray et al.

(10) Patent No.: US 12,634,889 B2
(45) Date of Patent: May 19, 2026

(54) PAGING ENHANCEMENTS FOR UE POWER SAVINGS

(71) Applicant: INTERDIGITAL PATENT HOLDINGS, INC., Wilmington, DE (US)

(72) Inventors: Joseph Murray, Schwenksville, PA (US); Pascal Adjakple, Great Neck, NY (US); Allan Tsai, Boonton, NJ (US); Yifan Li, Conshohocken, PA (US); Kyle Pan, Saint James, NY (US); Mohamed Awadin, San Diego, CA (US); Zhuo Chen, Claymont, DE (US); Michael Starsinic, Newtown, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 315 days.

(21) Appl. No.: 18/248,905

(22) PCT Filed: Oct. 14, 2021

(86) PCT No.: PCT/US2021/054964
§ 371 (c)(1),
(2) Date: Apr. 13, 2023

(87) PCT Pub. No.: WO2022/081834
PCT Pub. Date: Apr. 21, 2022

(65) Prior Publication Data
US 2023/0397167 A1 Dec. 7, 2023

Related U.S. Application Data

(60) Provisional application No. 63/091,608, filed on Oct. 14, 2020.

(51) Int. Cl.
*H04W 76/27* (2018.01)
*H04W 68/00* (2009.01)
*H04W 68/02* (2009.01)

(52) U.S. Cl.
CPC ......... *H04W 68/025* (2013.01); *H04W 76/27* (2018.02)

(58) Field of Classification Search
CPC ... H04W 68/00; H04W 68/025; H04W 68/02; H04W 76/27
See application file for complete search history.

(56) References Cited

U.S. PATENT DOCUMENTS

2020/0245246 A1 7/2020 Dhanda et al.
2022/0046540 A1* 2/2022 Kwon .................. H04W 16/28
(Continued)

FOREIGN PATENT DOCUMENTS

CN 111432469 A 7/2020
EP 3043607 A1 7/2016
(Continued)

OTHER PUBLICATIONS

"Technical Specification Group Radio Access Network; NR; Multiplexing and channel coding," 3GPP TS 38.212 V16.3.0, 2020, Release 16, pp. 152.
(Continued)

*Primary Examiner* — Jinsong Hu
*Assistant Examiner* — Farideh Madani
(74) *Attorney, Agent, or Firm* — Mark D. Pratt

(57) ABSTRACT

Methods, systems, and devices may assist in performing group-based paging, such as downlink control information-based group paging, paging radio network temporary identifier-based group paging, wakeup signal-based group paging, or sweep-based group paging. Also, method, systems,
(Continued)

and devices may assist in performing beam-based paging or configuring cross-slot scheduling for paging.

18 Claims, 19 Drawing Sheets

(56) References Cited

U.S. PATENT DOCUMENTS

| | | | |
|---|---|---|---|
| 2022/0264617 A1* | 8/2022 | Sha | H04W 72/20 |
| 2022/0312327 A1* | 9/2022 | Xu | H04W 52/0274 |
| 2023/0080113 A1* | 3/2023 | Hong | H04W 68/02 |
| | | | 370/329 |

FOREIGN PATENT DOCUMENTS

| | | | | |
|---|---|---|---|---|
| EP | 3886512 A1 | 9/2021 | | |
| WO | 2012/042379 A1 | 4/2012 | | |
| WO | 2013/097159 A1 | 7/2013 | | |
| WO | 2017/079574 A1 | 5/2017 | | |
| WO | WO2019183950 A1 | 10/2019 | | |
| WO | WO-2019193538 A1 * | 10/2019 | | H04W 68/025 |
| WO | 2020/125433 A1 | 6/2020 | | |
| WO | 2021/175162 A1 | 9/2021 | | |

OTHER PUBLICATIONS

"Technical Specification Group Radio Access Network; NR; NR and NG-RAN Overall Description," 3GPP TS 38.300 V16.3.0, 2020, Release 16, pp. 148.

"Technical Specification Group Radio Access Network; NR; Physical layer procedures for control," 3GPP TS 38.213 V16.3.0, 2020, Release 16, pp. 179.

"Technical Specification Group Radio Access Network; NR; Physical layer procedures for data," 3GPP TS 38.214 V16.3.0, 2020, Release 16, pp. 166.

"Technical Specification Group Radio Access Network; NR; Radio Resource Control (RRC) protocol specification," 3GPP TS 38.331 V16.2.0, 2020, Release 16, pp. 921.

"Technical Specification Group Radio Access Network; NR; User Equipment (UE) procedures in Idle mode and RRC Inactive state," 3GPP TS 38.304 V16.2.0, 2020, Release 16, pp. 39.

"Technical Specification Group Services and System Aspects; Procedures for the 5G System (5GS); Stage 2," 3GPP TS 23.502 V16.3.0, 2019, Release 16, pp. 558.

"Technical Specification Group Services and System Aspects; System architecture for the 5G System (5GS); Stage 2," 3GPP TS 23.501 V16.4.0, 2020, Release 16, pp. 430.

Ericsson, "Indication of CN initiated or RAN initiated paging," 3GPP TSG-RAN WG2 #102, R2-1806807, May 21-25, 2018, pp. 6.

Ericsson, "Indication of CN initiated or RAN initiated paging," 3GPP TSG-RAN WG2, R2-1804735, Apr. 16-20, 2018, pp. 3.

Huawei et al, "Paging Mechanism in inactive state and idle state," 3GPP TSG-RAN WG2#98, R2-1704887, May 15-19, 2017, pp. 4.

Samsung, "Paging Enhancements to Reduce Unnecessary Paging receptions," 3GPP TSG-RAN2 Meeting #111 Electronic, R2-2006774, Aug. 17-Aug. 28, 2020, pp. 5.

* cited by examiner

PAGING ENHANCEMENTS FOR UE POWER SAVINGS

CROSS-REFERENCE TO RELATED APPLICATIONS

This application is the National Stage Application of International Patent Application No. PCT/US2021/054964, filed Oct. 14, 2021, which claims the benefit of U.S. Provisional Patent Application No. 63/091,608, filed on Oct. 14, 2020, entitled "Paging Enhancements for UE Power Savings," the contents of which are hereby incorporated by reference herein.

BACKGROUND

UE may use Discontinuous Reception (DRX) in RRC_IDLE and RRC_INACTIVE state in order to reduce power consumption. The UE monitors one paging occasion (PO) per DRX cycle. A PO is a set of PDCCH monitoring occasions and can consist of multiple time slots (e.g. subframe or OFDM symbol) where paging DCI can be sent (TS 38.213 [1]). One Paging Frame (PF) is one Radio Frame and may contain one or multiple PO(s) or starting point of a PO.

This background information is provided to reveal information believed by the applicant to be of possible relevance. No admission is necessarily intended, nor should be construed, that any of the preceding information constitutes prior art.

SUMMARY

Disclosed herein are methods, systems, and devices that may assist in performing group-based paging, such as DCI-based group paging, P-RNTI-based group paging, WUS-based group paging, or sweep-based group paging. Also, method, systems, and devices may assist in performing beam-based paging or configuring cross-slot scheduling for paging.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

NR Paging: Discontinuous Reception for Paging

Figure 1:
FIG. 1 illustrates an exemplary Group-Based Paging.

The UE may use Discontinuous Reception (DRX) in RRC_IDLE and RRC_INACTIVE state in order to reduce power consumption. The UE monitors one paging occasion (PO) per DRX cycle. A PO is a set of PDCCH monitoring occasions and can consist of multiple time slots (e.g. subframe or OFDM symbol) where paging DCI can be sent (TS 38.213 [1]). One Paging Frame (PF) is one Radio Frame and may contain one or multiple PO(s) or starting point of a PO.

In multi-beam operations, the UE assumes that the same paging message and the same Short Message are repeated in all transmitted beams and thus the selection of the beam(s) for the reception of the paging message and Short Message is up to UE implementation. The paging message is same for both RAN initiated paging and CN initiated paging.

The UE initiates RRC Connection Resume procedure upon receiving RAN initiated paging. If the UE receives a CN initiated paging in RRC_INACTIVE state, the UE moves to RRC_IDLE and informs NAS.

The PF and PO for paging are determined by the following formulae:

SFN for the PF is determined by:

$$(SFN+PF\_\text{offset})\bmod T=(T \text{ div } N)*(UE\_ID \bmod N)$$

Index (i_s), indicating the index of the PO is determined by:

$$i\_s=\text{floor}(UE\_ID/N)\bmod N_S$$

The PDCCH monitoring occasions for paging are determined according to pagingSearchSpace as specified in TS 38.213 [1] and firstPDCCH-MonnoringOccasionOfPO and nrofPDCCH-MonnoringOccasionPerSSB-InPO if configured as specified in TS 38.331 [2]. When SearchSpaceId=0 is configured for pagingSearchSpace, the PDCCH monitoring occasions for paging are same as for RMSI as defined in clause 13 in TS 38.213 [1].

When SearchSpaceId=0 is configured for pagingSearchSpace, $N_S$ is either 1 or 2. For $N_S=1$, there is only one PO which starts from the first PDCCH monitoring occasion for paging in the PF. For $N_S=2$, PO is either in the first half frame (i_s=0) or the second half frame (i_s=1) of the PF.

When SearchSpaceId other than 0 is configured for pagingSearchSpace, the UE monitors the $(i\_s+1)^{th}$ PO. A PO is a set of 'S*X' consecutive PDCCH monitoring occasions where 'S' is the number of actual transmitted SSBs determined according to ssb-PositionsInBurst in SIB1 and X is the nrofPDCCH-MonhoringOccasionPerSSB-InPO if configured or is equal to 1 otherwise. The [x*S+K]$^{th}$ PDCCH monitoring occasion for paging in the PO corresponds to the K$^{th}$ transmitted SSB, where x=0, 1, . . . , X−1, K=1, 2, . . . , S. The PDCCH monitoring occasions for paging which do not overlap with UL symbols (determined according to tdd-UL-DL-ConfigurationCommon) are sequentially numbered from zero starting from the first PDCCH monitoring occasion for paging in the PF. When firstPDCCH-MonitoringOccasionOfPO is present, the starting PDCCH monitoring occasion number of (i_s+1)$^{th}$ PO is the (i_s+1)$^{th}$ value of the firstPDCCH-MonitoringOccasionOfPO parameter; otherwise, it is equal to i_s*S*X. If X>1, when the UE detects a PDCCH transmission addressed to P-RNTI within its PO, the UE is not required to monitor the subsequent PDCCH monitoring occasions for this PO.

NOTE 1: A PO associated with a PF may start in the PF or after the PF.

NOTE 2: The PDCCH monitoring occasions for a PO can span multiple radio frames. When SearchSpaceId other than 0 is configured for paging-SearchSpace the PDCCH monitoring occasions for a PO can span multiple periods of the paging search space.

The following parameters are used for the calculation of PF and i_s above:

T: DRX cycle of the UE (T is determined by the shortest of the UE specific DRX value(s), if configured by RRC or upper layers, and a default DRX value broadcast in system information. In RRC_IDLE state, if UE specific DRX is not configured by upper layers, the default value is applied).

N: number of total paging frames in T

N$_S$: number of paging occasions for a PF

PF_offset: offset used for PF determination

UE_ID: 5G-S-TMSI mod 1024

Parameters Ns, nAndPagingFrameOffset, nrofPDCCH-MonhoringOccasionPerSSB-InPO, and the length of default DRX Cycle are signaled in SIB1. The values of N and PF_offset are derived from the parameter nAndPagingFrameOffset as defined in TS 38.331 [2]. The parameterfirst-PDCCH-MonitoringOccasionOfPO is signalled in SIB1 for paging in initial DL BWP. For paging in a DL BWP other than the initial DL BWP, the parameter first-PDCCH-MonitoringOccasionOfPO is signaled in the corresponding BWP configuration.

If the UE has no 5G-S-TMSI, for instance when the UE has not yet registered onto the network, the UE shall use as default identity UE_ID=0 in the PF and i_s formulas above.

5G-S-TMSI is a 48-bit long bit string as defined in TS 23.501 [3]. SG-S-TMSI shall in the formulae above be interpreted as a binary number where the left most bit represents the most significant bit.

NR Paging: Paging DCI

The following information is transmitted by means of the DCI format 1_0 with CRC scrambled by P-RNTI [4]:

TABLE 1

| Paging DC | | |
|---|---|---|
| Field Name | # Bits | Comment |
| Short Messages Indicator | 2 | As defined in Table 2. |
| Short Messages | 8 | If only the scheduling information for Paging is carried, this bit field is reserved. |
| Frequency domain resource assignment | $\lceil \log_2(N_{RB}^{DL,BWP}(N_{RB}^{DL,BWP} + 1)/2)\rceil$ | If only the short message is carried, this bit field is reserved. |
| Time domain resource assignment | 4 | As defined in section 5.1.2.1 of TS 38.214 [5]. If only the short message is carried, this bit field is reserved. |
| VRB-to-PRB mapping | 1 | As defined in Table 7.3.1.1.2-33 of TS 38.212 [4]. If only the short message is carried, this bit field is reserved. |
| Modulation and coding scheme | 5 | As defined in section 5.1.3 of TS 38.214 [5]. If only the short message is carried, this bit field is reserved. |
| TB scaling | 2 | As defined in section 5.1.3.2 of [5]. If only the short message is carried, this bit field is reserved. |
| Reserved | 6 or 8 | 8 bits for operation in a cell with shared spectrum channel access; otherwise 6 bits |

TABLE 2

| Short Message Indicator | |
| --- | --- |
| Bit Field | Description |
| 00 | Reserved |
| 01 | Only scheduling information for Paging is present in the DCI |
| 10 | Only short message is present in the DCI |
| 11 | Both scheduling information for Paging and short message are present in the DCI |

NR Paging: PCCH-Config

The IE DownlinkConfigCommonSIB provides common downlink parameters of a cell. This IE includes the PCCH-Config field, which is used to provide the DRX configuration for the cell TS 38.331 [2].

| PCCH-Config Field |
| --- |

```
PCCH-Config ::=                                          SEQUENCE {
    defaultPagingCycle                                       PagingCycle,
    nAndPagingFrameOffset                                    CHOICE {
        oneT                                                 NULL,
        halfT                                                INTEGER (0..1),
        quarterT                                             INTEGER (0..3),
        oneEighthT                                           INTEGER (0..7),
        oneSixteenthT                                        INTEGER (0..15)
    },
    ns                                                       ENUMERATED {four, two, one},
    firstPDCCH-MonitoringOccasionOfPO                        CHOICE {
        sCS15KHZoneT                                                 SEQUENCE (SIZE (1..maxPO-
perPF)) OF INTEGER (0..139),
        sCS30KHZoneT-SCS15KHZhalfT                                       SEQUENCE (SIZE
(1..maxPO-perPF)) OF INTEGER (0..279),
        sCS60KHZoneT-SCS30KHZhalfT-SCS15KHZquarterT                          SEQUENCE
(SIZE (1..maxPO-perPF)) OF INTEGER (0..559),
        sCS120KHZoneT-SCS60KHZhalfT-SCS30KHZquarterT-SCS15KHZoneEighthT
SEQUENCE (SIZE (1..maxPO-perPF)) OF INTEGER (0..1119),
        sCS120KHZhalfT-SCS60KHZquarterT-SCS30KHZoneEighthT-
SCS15KHZoneSixteenthT
                                                             SEQUENCE (SIZE (1..maxPO-perPF)) OF
INTEGER (0..2239),
        sCS120KHZquarterT-SCS60KHZoneEighthT-SCS30KHZoneSixteenthT
SEQUENCE (SIZE (1..maxPO-perPF)) OF INTEGER (0..4479),
        sCS120KHZoneEighthT-SCS60KHZoneSixteenthT                            SEQUENCE
(SIZE (1..maxPO-perPF)) OF INTEGER (0..8959),
        sCS120KHZoneSixteenthT                                       SEQUENCE (SIZE
(1..maxPO-perPF)) OF INTEGER (0..17919)
    } OPTIONAL,                                          -- Need R
    ...,
    [[
    nrofPDCCHMonitoringOccasionPerSSB-InPO-r16                           INTEGER (2..4)
OPTIONAL -- Need R
    ]]
}
```

| PCCH-Config field descriptions |
| --- | defaultPagingCycle
Default paging cycle, used to derive 'T' in TS 38.304 [6]. Value rf32 corresponds to 32 radio frames, value rf64 corresponds to 64 radio frames and so on.
firstPDCCH-MonitoringOccasionOfPO
Points out the first PDCCH monitoring occasion for paging of each PO of the PF, see TS 38.304 [6].
nAndPagingFrameOffset
Used to derive the number of total paging frames in T (corresponding to parameter N in TS 38.304 [6]) and paging frame offset (corresponding to parameter PF_offset in TS 38.304 [6]). A value of oneSixteenthT corresponds to T / 16, a value of oneEighthT corresponds to T / 8, and so on.
If pagingSearchSpace is set to zero and if SS/PBCH block and CORESET multiplexing pattern is 2 or 3 (as specified in TS 38.213 [1]):
- for ssb-periodicityServingCell of 5 or 10 ms, N can be set to one of {oneT, halfT, -continued

| PCCH-Config field descriptions |
|---|
| quarterT, oneEighthT, oneSixteenthT}<br>- for ssb-periodicityServingCell of 20 ms, N can be set to one of {halfT, quarterT, oneEighthT, oneSixteenthT}<br>- for ssb-periodicityServingCell of 40 ms, N can be set to one of {quarterT, oneEighthT, oneSixteenthT}<br>- for ssb-periodicityServingCell of 80 ms, N can be set to one of {oneEighthT, oneSixteenthT}<br>- for ssb-periodicityServingCell of 160 ms, N can be set to oneSixteenthT<br>If pagingSearchSpace is set to zero and if SS/PBCH block and CORESET multiplexing pattern is 1 (as specified in TS 38.213 [1]), N can be set to one of {halfT, quarterT, oneEighthT, oneSixteenthT}<br>If pagingSearchSpace is not set to zero, N can be configured to one of {oneT, halfT, quarterT, oneEighthT, oneSixteenthT}<br>ns<br>Number of paging occasions per paging frame.<br>nrofPDCCH-MonitoringOccasionPerSSB-InPO<br>The number of PDCCH monitoring occasions corresponding to an SSB within a Paging Occasion, see TS 38.304 [6], clause 7.1. |

NR Paging: Short Message

Short Messages can be transmitted on PDCCH using P-RNTI with or without associated Paging message using Short Message field in DCI format 1_0.

Table 3 defines Short Messages [2]. Bit 1 is the most significant bit.

TABLE 3

Short Messages

| Bit | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification or an ETWS secondary notification or a CMAS notification. |
| 3 | stopPagingMonitoring<br>If set to 1: stop monitoring PDCCH occasions(s) for paging in this PO. |
| 4-8 | Not used in this release of the specification, and shall be ignored by UE if received. |

Public Warning System

NR connected to 5GC provides support for public warning systems (PWS) through means of system information broadcast capability. NR is responsible for scheduling and broadcasting of the warning messages as well as for paging the UE to provide indication that the warning message is being broadcast via Earthquake and Tsunami Warning System (ETWS) or Commercial Mobile Alert System (CMAS).

Earthquake and Tsunami Warning System: ETWS is a public warning system developed to meet the regulatory requirements for warning notifications related to earthquake or tsunami events. ETWS warning notifications can either be a primary notification (short notification) or secondary notification (providing detailed information).

Commercial Mobile Alert System: CMAS is a public warning system developed for the delivery of multiple, concurrent warning notifications.

Different SIBs are defined for ETWS primary notification, ETWS secondary notification and CMAS notification. Paging is used to inform UEs about ETWS indication and CMAS indication. UE monitors ETWS/CMAS indication in its own paging occasion for RRC_IDLE and RRC_INAC-TIVE. UE monitors ETWS/CMAS indication in any paging occasion for RRC Connected. Paging indicating ETWS/

CMAS notification triggers acquisition of system information (without delaying until the next modification period) 3GPP TS 38.300 [7].

UE Assistance Information

When configured to do so, the UE can signal the network through UEAssistanceInformation [7]:

If it prefers an adjustment in the connected mode DRX cycle length, for the purpose of delay budget reporting;

If it is experiencing internal overheating;

If it prefers certain DRX parameter values, or a reduced maximum number of secondary component carriers, or a reduced maximum aggregated bandwidth or a reduced maximum number of MIMO layers or minimum scheduling offsets K0 and K2 for power saving purpose;

If it expects not to send or receive any more data in the near future, and in this case, it can provide its preference to transition out of RRC_CONNECTED where this indication may express its preferred RRC state, or alternately, it may cancel an earlier indicated preference to transition out of RRC_CONNECTED;

The list of frequencies affected by IDC problems

In the second case, the UE can express a preference for temporarily reducing the number of maximum secondary component carriers, the maximum aggregated bandwidth and the number of maximum MIMO layers. In all cases, it is up to the gNB whether to accommodate the request.

For sidelink, the UE can report SL traffic pattern(s) to NG-RAN, for periodic traffic.

Expected UE Behaviour Parameters

Table 4.15.6.3-1 of TS 23.502 [8] provides a description of the expected UE behaviour parameters maintained by the Core Network that may be used to characterize the foreseen behaviour of a UE or a group of UEs. An excerpt of this table is shown as Table 4 below.

TABLE 4

Description of Expected UE Behaviour Parameters

| Expected UE Behaviour parameter | Description |
|---|---|
| Expected UE Moving Trajectory | Identifies the UE's expected geographical movement<br>Example: A planned path of movement |

TABLE 4-continued

Description of Expected UE Behaviour Parameters

| Expected UE Behaviour parameter | Description |
|---|---|
| Stationary Indication | Identifies whether the UE is stationary or mobile [optional] |
| Communication Duration Time | Indicates for how long the UE will normally stay in CM-Connected for data transmission. Example: 5 minutes. [optional] |
| Periodic Time | Interval Time of periodic communication Example: every hour. [optional] |
| Scheduled Communication Time | Time and day of the week when the UE is available for communication. Example: Time: 13:00-20:00, Day: Monday. [optional] |
| Battery Indication | Identifies power consumption criticality for the UE: if the UE is battery powered with not rechargeable/not replaceable battery, battery powered with rechargeable/replaceable battery, or not battery powered. [optional] |
| Traffic Profile | Identifies the type of data transmission: single packet transmission (UL or DL), dual packet transmission (UL with subsequent DL or DL with subsequent UL), multiple packets transmission [optional] |
| Scheduled Communication Type | Indicates that the Scheduled Communication Type is Downlink only or Uplink only or Bi-directional [To be used together with Scheduled Communication Time] Example: <Scheduled Communication Time>, DL only. [optional] |

Statement #1: Paging False Alarms

A UE in RRC_IDLE/RRC_INACTIVE is required to monitor for paging during one PO per DRX cycle. The same PO may be monitored by multiple UEs during a given Paging Frame. When any of the UEs monitoring a given PO are paged, all UEs monitoring the PO need to receive the Paging Message to determine if it includes a Paging Record matching the identity of the UE. In most cases, the paging indication is a false alarm; i.e. the Paging Message does not include the UE's identity, which results in unnecessary power consumption.

The paging false alarm rate is directionally proportional to the device density. Use cases such as Industrial Wireless Sensors and Wearables will increase the device density in the network, thereby increasing the paging false alarm rate in the network.

The paging false alarm rate can be exacerbated due to Idle Mode mobility. A typical paging strategy is for the network to page a UE in the last cell used to communicate with the UE. If the UE does not respond to the page, paging escalation is performed, where the UE is paged in multiple cells; e.g. all cells of the TA where the UE is assumed to be located. This can result in paging false alarms for other UEs in the cells where the paging escalation is being performed.

Therefore, to reduce power consumption when performing paging monitoring, there is a need for a mechanism to reduce the paging false alarm rate.

Statement #2: Unnecessary Power Consumption when Performing Paging Monitoring

A UE in RRC_IDLE/RRC_INACTIVE is required to monitor for paging during one PO per DRX cycle. When monitoring for paging, the UE attempts to receive the PDCCH carrying the Paging DCI and if the Paging DCI includes scheduling information, the UE also receives the PDSCH carrying the Paging Message to determine if it includes a Paging Record matching the identity of the UE.

The hardware that is used for PDCCH reception is typically in a different power island than the hardware that is used for PDSCH reception, thereby enabling the HW components to be powered on/off independently. However, when monitoring for paging, the PDSCH receiver hardware is typically powered on at the same time as the PDCCH receiver hardware, since the PDSCH carrying the Paging Message may be scheduled in the same slot as the Paging DCI, and there would not be enough time to power on the PDSCH receiver hardware after receiving the Paging DCI. This results in unnecessary power consumption for scenarios where the Paging Message is not scheduled for the PO.

Therefore, to reduce power consumption when performing paging monitoring, there is need for a mechanism that allows a UE to only power on PDSCH receiver hardware for scenarios where the Paging Message is scheduled for the PO.

Disclosed herein are methods or systems to perform group-based paging, such as DCI-based group paging, P-RNTI-based group paging, WUS-based group paging, or sweep-based group paging. Also disclosed herein are methods or systems for performing beam-based paging or for configuring cross-slot scheduling for paging.

The following are exemplary methods or systems (also referred to as approaches) for performing group-based paging. A first device may be configured to execute the instructions of: determining a PO to monitor for paging; determining a paging group associated with the device; and monitoring for paging of the determined paging group during the determined PO. The determining a paging group associated with the device may further include determining the paging group associated with the device based on a configured number of LSBs of the UE_ID, in which the configured number of LSBs may be determined based on the total number of paging groups supported by the network. The paging group associated with the device may be determined based on the RRC state. A first paging group may be defined for UEs in RRC_IDLE and a second paging group may be defined for UEs in RRC_INACTIVE. The paging group associated with the device may be determined based on one or more of the following: the device type, the device ID, the release of the device, the power consumption profile of the device, the battery level of the device, the traffic profile, or the mobility state of the device. A first paging group may be defined for regular UEs and a second paging group may be defined for reduced capability (RedCap) UEs.

With continued reference to the performing of group-based paging, the determining a paging group associated with the device may further include receiving assistance information from the second device and selecting a paging group based on the received assistance information. The assistance information may correspond to the paging probability of the first device. The determining a paging group associated with the device may further include receiving a message from a second device comprising an indication of the paging group associated with the first device. The behavior may further include comprising reporting assistance information to the second device. The assistance information may correspond to the expected mobility behavior of the device, in which the expected mobility behavior may be stationary, nomadic, or mobile. The assistance information may correspond to the mobility state of the first device or a change in the mobility state in the first device. The assistance information may correspond to a preferred paging group. The reporting assistance information may correspond to transmission of a UEAssistanceInformation message. The behavior may further include receiving paging DCI that includes the paging group information or scheduling information for a PDSCH carrying a paging message.

With continued reference to the performing of group-based paging, the behavior may further include receiving paging group information corresponding to the paging group associated with the device; and receiving a paging message carried on the PDSCH scheduled by the scheduling information in the paging DCI. The paging group associated with the device may include a primary paging group or a secondary paging group, in which the primary paging group may be indicated via a first field in the paging DCI; and the secondary paging group may be indicated via a second field that may be included in the paging DCI, in which the presence of the second field is indicated via a third field in the paging DCI. The third field may be the short messages indicator field of the paging DCI. A value of 1 for the short message indicator field may indicate the optional second field is present in the paging DCI and a value of 2 or 3 for the short messages indicator field indicates the optional second field is not present in the paging DCI. The behavior may further include receiving paging DCI, wherein the primary paging group information in the paging DCI does not correspond to the primary paging group associated with the device; and entering DRX. The behavior may further include receiving paging DCI, wherein the third field of the paging DCI indicates the optional second field is not present in the paging DCI and the primary paging group information in the paging DCI corresponds to the primary paging group associated with the device; and receiving a paging message carried on the PDSCH scheduled by the scheduling information in the paging DCI.

With the continued performing of group-based paging, the behavior may include receiving paging DCI, wherein the third field of the paging DCI indicates the optional second field is present in the paging DCI and the primary paging group information in the paging DCI corresponds to the primary paging group associated with the device and the secondary paging group information in the paging DCI corresponds to the secondary paging group associated with the device; and receiving a paging message carried on the PDSCH scheduled by the scheduling information in the paging DCI. The behavior may further include receiving paging DCI, in which the third field of the paging DCI indicates the optional second field is present in the paging DCI and the primary paging group information in the paging DCI corresponds to the primary paging group associated with the device and secondary paging group information in the Paging DCI does not correspond to the secondary paging group associated with the device; and entering DRX. The monitoring for paging may further include determining a first RNTI used to address PDCCH transmissions carrying the Paging DCI to the paging group associated with the device; and monitoring for a PDCCH addressed to the first RNTI during the determined PO.

With continued reference to the performing of group-based paging, in which the determining a first RNTI may further include selecting a RNTI associated with the determined paging group from a plurality of RNTIs, in which each RNTI in the plurality of RNTIs may be associated with a different paging group. The plurality of RNTIs may be received from the second device or specified per the standard. The behavior may further include receiving a PDCCH carrying the paging DCI that may be addressed to the first RNTI, wherein the paging DCI includes scheduling information for a PDSCH carrying a paging message; and receiving the paging message carried on the PDSCH scheduled by the scheduling information in the paging DCI. The behavior may further include determining a second RNTI used to address PDCCH transmissions carrying the paging DCI to all paging groups; and monitoring for a PDCCH addressed to the first RNTI or the second RNTI during the determined PO. The second RNTI may be received from the second device or specified per the standard. The behavior may further include receiving a PDCCH carrying the paging DCI addressed to the first RNTI or the second RNTI, wherein the paging DCI comprises a short message. The behavior may further include receiving a PDCCH carrying the paging DCI addressed to the first RNTI or the second RNTI, wherein the paging DCI comprises scheduling information for a PDSCH carrying a paging message; and receiving the paging message carried on the PDSCH scheduled by the scheduling information in the paging DCI.

With continued reference to the aforementioned, the behavior may further include monitoring for reception of a wakeup signal (WUS), wherein the WUS comprises paging group information; receiving a WUS comprising paging group information corresponding to the paging group associated with the device; monitoring for paging during the determined PO; receiving paging DCI during the determined PO, wherein the paging DCI comprises scheduling information for a PDSCH carrying a paging Message; and receiving a paging message carried on the PDSCH scheduled by the scheduling information in the paging DCI. The WUS may be signaled via PDCCH that may be monitored during a PDCCH monitoring occasion that occurs prior to the determined PO. The offset between the WUS monitoring occasion and the PO may be configured via RRC signaling. The offset between the WUS monitoring occasion and the PO may be determined based on the paging group associated with the device. The first device may make the determination to monitor for paging during the determined PO based on the received WUS. The received WUS may indicate implicitly or explicitly the paging group information. The monitoring for paging may further include determining a subset of PDCCH monitoring occasions associated with the paging group associated with the device from plurality the plurality of PDCCH monitoring occasions comprising the PO; and monitoring for paging during the determined subset of PDCCH monitoring occasions. A subset of PDCCH monitoring occasions may correspond to a paging sweep. The behavior may further include receiving paging DCI, wherein the paging DCI comprises scheduling information for a PDSCH carrying a paging message; and receiving the paging message carried on the PDSCH scheduled by the scheduling information in the paging DCI.

With continued reference to the aforementioned, the behavior may further include receiving paging DCI comprising the paging group information and scheduling information for a PDSCH carrying a paging message, wherein the PDSCH may be scheduled in a slot that may be different than the slot in which the paging DCI was received. An indication of the slot offset may be signaled to the device via system information. All combinations in this paragraph and the previous paragraphs (including the removal or addition of steps) are contemplated in a manner that is consistent with the other portions of the detailed description.

Note: The term "primary paging group" may be used interchangeably with "first paging group"; and the term "secondary paging group" may be used interchangeably with "second paging group."

The following are exemplary methods or systems (e.g., approaches) for performing beam-based paging. A first device may be configured to execute the instructions of: establishing and RRC connection with a second device; receiving paging preference configuration information from the second device; configuring the first device to report paging preference information to the second device; determining a plurality of preferred PDCCH monitoring occasions for paging; reporting paging preference information to the second device, wherein the paging preference information may include an indication of the plurality of preferred PDCCH monitoring occasions for paging; releasing the RRC connection; and monitoring the plurality of preferred PDCCH monitoring occasions for paging. The receiving paging preference configuration information may correspond to reception of an RRCReconfiguration message that may include a PagingPreferenceConfig IE; and the reporting paging preference information may correspond to transmission of a UEAssistanceInformation message that may include a PagingPreference IE. The PagingPreference IE may include a plurality of indices corresponding to the preferred PDCCH monitoring occasions for paging, wherein the index of a PDCCH monitoring occasion for paging that the device will monitor corresponds to the index K of the corresponding transmitted SSB, wherein the $[x*S+K]^{th}$ PDCCH monitoring occasion for paging in the PO corresponds to the $K^{th}$ transmitted SSB, where x=0, 1, . . . , X−1, K=1, 2, . . . , S, where 'S' may be the number of actual transmitted SSBs and X may be the number of PDCCH monitoring occasions per SSB in a PO if configured or may be equal to 1 otherwise.

With continued reference to performing beam-based paging, the device may determine the plurality of preferred PDCCH monitoring occasions for paging based on the RSRP measurements of the corresponding SSBs. The plurality of preferred PDCCH monitoring occasions for paging may be any PDCCH monitoring occasion for paging that corresponds to an SSB with an RSRP measurement above a configured threshold. The plurality of preferred PDCCH monitoring occasions for paging may be the PDCCH monitoring occasion for paging that corresponds to the SSB with the largest RSRP measurement. The behavior may further include receiving paging DCI during a preferred PDCCH monitoring occasion for paging. The behavior may further include receiving paging DCI comprising scheduling information for a PDSCH carrying a paging message; and receiving the paging message carried on the PDSCH scheduled by the scheduling information in the paging DCI. The reporting paging preference information to the second device may further include determining the plurality of preferred PDCCH monitoring occasions for paging may be different than the one indicated in the last report of paging preference information and the prohibit timer associated with reporting paging preference information may be not running; reporting the paging preference information to the second device; and starting the prohibit timer associated with reporting paging preference information, wherein the prohibit timer may be set to a value provided in the paging preference configuration information. The reporting paging preference information to the second device may further includes determining the device did not report paging preference information since being configured to report paging preference information; and reporting the paging preference information to the second device. The device may be a stationary, nomadic, or low mobility device. All combinations in this paragraph and the previous paragraphs (including the removal or addition of steps) are contemplated in a manner that is consistent with the other portions of the detailed description. The approaches described in this section may be used on their own or in combination with each other.

The subject matter disclosed herein may be used on its own or in combination with each other.

Considerations of Statement #1

Group-Based Paging

To reduce the paging false alarm rate, disclose is the use of group-based paging, where the UEs monitoring a given PO are assigned to different paging groups and the network provides an indication of the group(s) being paged when transmitting the paging to the UEs. The paging group may be determined based on rules defined per the specification, based on paging preference/assistance information exchanged between the UE and the network, based on assignment from the network or any combination thereof.

FIG. 1 illustrates an exemplary Group-Based Paging. At step 211, paging preference or assistance information may be exchanged be network 202 and UE 201. At step 212 UE 201 may receiving paging, which may include paging group information. In one example, the paging group is determined based on the Ng LSBs of the UE_ID, thereby evenly distributing the UEs monitoring a given PO to Ng different paging groups.

Paging Group=UE_ID mod Ng, where UE_ID 5G-S-TMSI mod 1024

The value Ng may be defined per the standards. Alternatively, the value Ng (e.g., the total number of paging group) could be configured by network 202 (e.g., via system information). For example, the number of paging groups may be signaled as an Ng field included in the PCCH-Config IE, as shown in Table 5.

TABLE 5

```
PCCH-Config ::=            SEQUENCE {
    defaultPagingCycle        PagingCycle,
    nAndPagingFrameOffset     CHOICE {
    oneT                      NULL,
    halfT                     INTEGER (0..1),
    quarterT                  INTEGER (0..3),
    oneEighthT                INTEGER (0..7),
    oneSixteenthT             INTEGER (0..15)
    },
    Ns                        ENUMERATED {four, two, one},
    firstPDCCH-MonitoringOccasionOfPO            CHOICE {
        sCS15KHZoneT
                              SEQUENCE (SIZE (1..maxPO-perPF)) OF INTEGER (0..139),
        sCS30KHZoneT-SCS15KHZhalfT
                              SEQUENCE (SIZE (1..maxPO-perPF)) OF INTEGER (0..279),
        sCS60KHZoneT-SCS30KHZhalfT-SCS15KHZquarterT
                              SEQUENCE (SIZE (1..maxPO-perPF)) OF INTEGER (0..559),
        sCS120KHZoneT-SCS60KHZhalfT-SCS30KHZquarterT-SCS15KHZoneEighthT
```

TABLE 5-continued

```
                          SEQUENCE (SIZE (1..maxPO-perPF)) OF INTEGER (0..1119),
    sCS120KHZhalfT-SCS60KHZquarterT-SCS30KHZoneEighthT-
SCS15KHZoneSixteenthT
                          SEQUENCE (SIZE (1..maxPO-perPF)) OF INTEGER (0..2239),
    sCS120KHZquarterT-SCS60KHZoneEighthT-SCS30KHZoneSixteenthT
                          SEQUENCE (SIZE (1..maxPO-perPF)) OF INTEGER (0..4479),
    sCS120KHZoneEighthT-SCS60KHZoneSixteenth
                          SEQUENCE (SIZE (1..maxPO-perPF)) OF INTEGER (0..8959),
    sCS120KHZoneSixteenthT
                          SEQUENCE (SIZE (1..maxPO-perPF)) OF INTEGER (0..17919)
    } OPTIONAL,          -- Need R
    ...,
    [[
    nrofPDCCH-MonitoringOccasionPerSSB-InPO-r16
                          INTEGER (2..4)        OPTIONAL -- Cond SharedSpectrum2
    ]],
    Ng                    INTEGER (1..2)        OPTIONAL
}
```

In another example, the paging group is determined based on the RRC state. For example, a first paging group may be defined for UEs in RRC_IDLE and a second paging group for UEs in RRC_INACTIVE.

In another example, the paging group is determined based on one or more of the following: the device type, the device ID, the release of the device, the power consumption profile of the device, the battery level of the device, the traffic profile, the mobility state of the device. For example, a first paging group could be defined for regular UEs and second paging group could be defined for Reduced Capability (RedCap) UEs.

Figure 2:
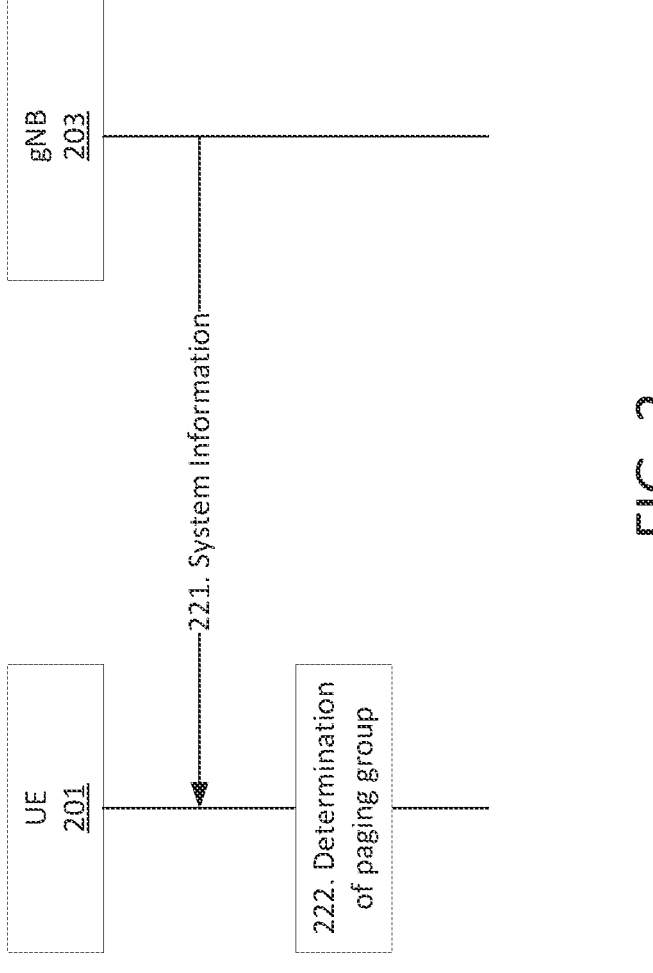
FIG. 2 illustrates Rule-Based Paging Group Determination.

An exemplary signaling diagram for rule-based paging group determination is shown in FIG. 2. At step 221, UE 201 receives system information providing an indication of the paging groups configured for the cell, from network 202 (e.g., gNB 203). At step 222, UE 201 applies predefined rules to determine which paging group it belongs to.

In another example, the paging group may be determined based on service, in which UE 201 is assigned to a paging group based on the service(s) being used or the service(s) it may request to use. In one such example, the paging groups are defined based on paging probability, P. UE 201 may determine its paging probability autonomously or based on assistance information provided by the network. For example, subscription information known to the network 202 may be used to determine a paging probability that is then signaled to UE 201 using higher layer signaling (e.g., NAS, RRC). After determining a UE's paging probability, the paging group to which UE 201 is assigned may be determined based on a set of thresholds (e.g., prob-ThreshList), wherein the total number of paging groups is defined as the number of entries in probThreshList+1. The paging group would then be determined based on the paging probability and the set of thresholds according to conditions such as those defined in Table 6.

TABLE 6

| Paging Group Definition Based on Paging Probability | |
| --- | --- |
| Paging Group | Condition |
| 1 | $P \leq Thresh_1$ |
| 2 | $Thresh_1 < P \leq Thresh_2$ |
| 3 | $Thresh_2 < P \leq Thresh_3$ |
| 4 | $Thresh_3 < P$ |

The set of thresholds could be defined per the specification or signaled via broadcast or dedicated signaling. For example, the set of thresholds could be signaled as a probThreshList field included in the PCCH-Config IE as shown in Table 7, where 0dot25 corresponds to 0.25, 0dot50 corresponds to 0.50 and so on. And in other alternatives, the probThreshList could be configured via RRC signaling and the paging probability could be signaled via a MAC-CE.

TABLE 7

```
PCCH-Config ::=          SEQUENCE {
    defaultPagingCycle       PagingCycle,
    nAndPagingFrameOffset    CHOICE {
    oneT                     NULL,
    halfT                    INTEGER (0..1),
    quarterT                 INTEGER (0..3),
    oneEighthT               INTEGER (0..7),
    oneSixteenthT            INTEGER (0..15)
    },
    Ns                       ENUMERATED {four, two, one},
    firstPDCCH-MonitoringOccasionOfPO          CHOICE {
        sCS15KHZoneT
                          SEQUENCE (SIZE (1..maxPO-perPF)) OF INTEGER (0..139),
        sCS30KHZoneT-SCS15KHZhalfT
                          SEQUENCE (SIZE (1..maxPO-perPF)) OF INTEGER (0..279),
        sCS60KHZoneT-SCS30KHZhalfT-SCS15KHZquarterT
                          SEQUENCE (SIZE (1..maxPO-perPF)) OF INTEGER (0..559),
        sCS120KHZoneT-SCS60KHZhalfT-SCS30KHZquarterT-SCS15KHZoneEighthT
                          SEQUENCE (SIZE (1..maxPO-perPF)) OF INTEGER (0..1119),
        sCS120KHZhalfT-SCS60KHZquarterT-SCS30KHZoneEighthT-SCS15KHZoneSixteenthT
                          SEQUENCE (SIZE (1..maxPO-perPF)) OF INTEGER (0..2239),
```

TABLE 7-continued

```
sCS120KHZquarterT-SCS60KHZoneEighthT-SCS30KHZoneSixteenthT
                        SEQUENCE (SIZE (1..maxPO-perPF)) OF INTEGER (0..4479),
sCS120KHZoneEighthT-SCS60KHZoneSixteenth
                        SEQUENCE (SIZE (1..maxPO-perPF)) OF INTEGER (0..8959),
sCS120KHZoneSixteenthT
                        SEQUENCE (SIZE (1..maxPO-perPF)) OF INTEGER (0..17919)
} OPTIONAL,           -- Need R
...,
[[
    nrofPDCCH-MonitoringOccasionPerSSB-InPO-r16
                        INTEGER (2..4)          OPTIONAL -- Cond SharedSpectrum2
]],
probThreshList          SEQUENCE (SIZE (1..maxProbThresholds)) of
                             ENUMERATED (0dot25, 0dot50, 0dot75, spare1) OPTIONAL
}
```

And in another example, a first paging group may be defined for the UEs 201 receiving the unicast transmission and second paging group could be defined for the UEs 201 receiving the Multimedia/Broadcast Service (MBS).

Figure 3:
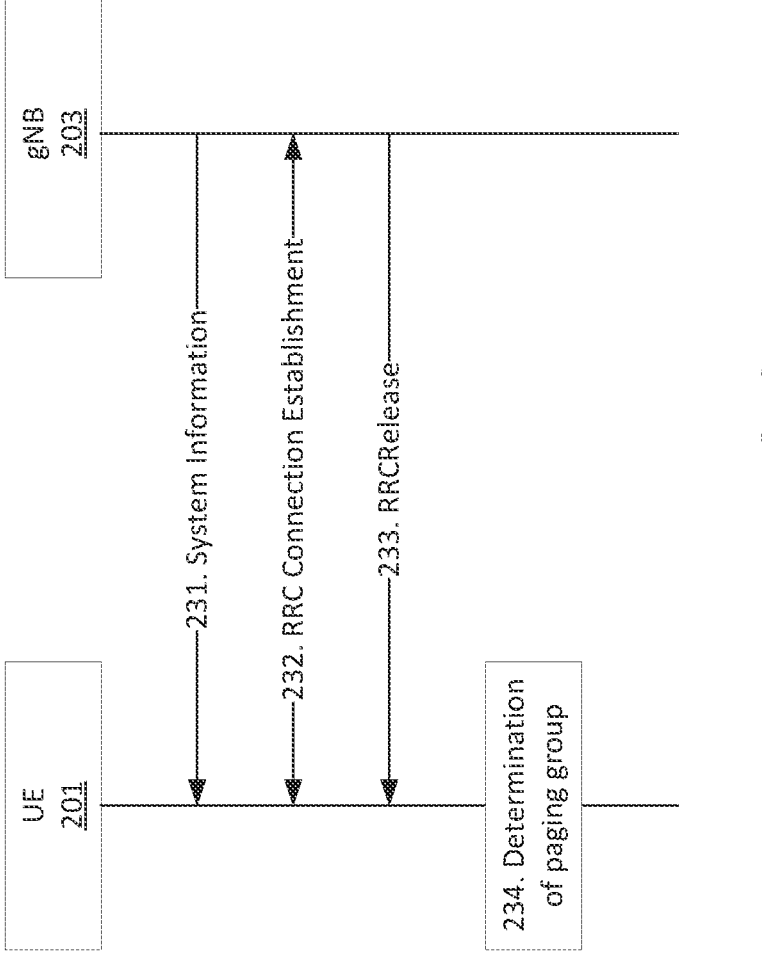
FIG. 3 illustrates Network-Assisted Paging Group Determination.

An exemplary signaling diagram for network-assisted paging group determination is shown in FIG. 3. At step 231, UE 201 receives system information that includes the paging configuration and other configuration parameters for the cell. At step 232, UE 201 establishes an RRC connection with gNB 203 (e.g., network 202). At step 233, UE 201 receives an RRCRelease message comprising paging assistance information. At step 234, UE 201 determines its paging group based, at least in part, on the paging assistance information provided by gNB 203.

And in another example, UE 201 is assigned to a paging group by gNB 203. Subscription information known to gNB 203 may be used to determine the paging group. Higher layer signaling (e.g., NAS, RRC) may be used to indicate the assigned paging group to UE 201.

Paging preference/assistance information reported by UE 201 may also be used by gNB 203 to determine the paging group. For example, UE 201 may provide an indication of the expected mobility behavior (e.g., stationary, nomadic, or mobile). In another example, UE 201 may provide an indication of its detected mobility state (e.g., normal-mobility state, medium-mobility state, or high-mobility state). And in yet another example, UE 201 may provide an indication of a preferred paging group determined by UE 201. And in yet another example, UE 201 may provide an indication of its speed.

Dedicated signaling may be used to configure UE 201 to report paging assistance information. In one example, an RRCReconfiguration message that includes paging preference configuration information may be used to configure UE 201 to report paging assistance. The paging preference configuration information may be signaled as a PagingPreferenceReporting field included in the OtherConfig IE as shown in Table 8.

TABLE 8

| | |
|---|---|
| OtherConfig-v1610 ::= | SEQUENCE { |
| idc-AssistanceConfig-r16 | SetupRelease {IDC-AssistanceConfig-r16} |
| | OPTIONAL, -- Need |
| drx-PreferenceConfig-r16 | SetupRelease {DRX-PreferenceConfig-r16} |
| | OPTIONAL, -- Need M |
| maxBW-PreferenceConfig-r16 | SetupRelease {MaxBW-PreferenceConfig-r16} |
| | OPTIONAL, -- Need M |
| maxCC-PreferenceConfig-r16 | SetupRelease {MaxCC-PreferenceConfig-r16} |
| | OPTIONAL, -- Need M |
| maxMIMO-LayerPreferenceConfig-r16} | SetupRelease {MaxMIMO-LayerPreferenceConfig- |
| | OPTIONAL, -- Need M |
| minSchedulingOffsetPreferenceConfig-r16 {MinSchedulingOffsetPreferenceConfig-r16} M | SetupRelease |
| | OPTIONAL, -- Need |
| releasePreferenceConfig-r16 | SetupRelease {ReleasePreferenceConfig-r16} |
| | OPTIONAL, -- Need M |
| referenceTimePreferenceReporting-r16 | ENUMERATED {true} |
| | OPTIONAL, -- Need R |
| btNameList-r16 | SetupRelease {BT-NameList-r16} |
| | OPTIONAL, -- Need M |
| wlanNameList-r16 | SetupRelease {WLAN-NameList-r16} |
| | OPTIONAL, -- Need M |
| sensorNameList-r16 | SetupRelease {Sensor-NameList-r16} |
| | OPTIONAL, -- Need M |
| obtainCommonLocation-r16 | ENUMERATED {true}   OPTIONAL, -- Need R |
| sl-AssistanceConfigNR-r16 | ENUMERATED {true}   OPTIONAL, -- Need R |
| pagingPreferenceReporting | ENUMERATED {true]   OPTIONAL |
| } | |

In another example, a PagingPreferenceConfig parameter may be defined, wherein the parameter is comprised of additional fields used to configure the paging preference reporting (e.g., a pagingPreferenceProhibitTimer) as shown in Table 9.

TABLE 9

```
OtherConfig-v1610 ::=                            SEQUENCE {
    idc-AssistanceConfig-r16                         SetupRelease {IDC-AssistanceConfig-r16}
                                                             OPTIONAL, -- Need M
    drx-PreferenceConfig-r16                         SetupRelease {DRX-PreferenceConfig-r16}
                                                             OPTIONAL, -- Need M
    maxBW-PreferenceConfig-r16                       SetupRelease {MaxBW-PreferenceConfig-r16}
                                                             OPTIONAL, -- Need M
    maxCC-PreferenceConfig-r16                       SetupRelease {MaxCC-PreferenceConfig-r16}
                                                             OPTIONAL, -- Need M
    maxMIMO-LayerPreferenceConfig-r16               SetupRelease {MaxMIMO-LayerPreferenceConfig-
r16}                                                         OPTIONAL, -- Need M
    minSchedulingOffsetPreferenceConfig-r16             SetupRelease
{MinSchedulingOffsetPreferenceConfig-r16}                                OPTIONAL, -- Need M
    releasePreferenceConfig-r16                     SetupRelease {ReleasePreferenceConfig-r16}
                                                             OPTIONAL, -- Need M
    referenceTimePreferenceReporting-r16            ENUMERATED {true}
                                                             OPTIONAL, -- Need R
    btNameList-r16                                  SetupRelease {BT-NameList-r16}
                                                             OPTIONAL, -- Need M
    wlanNameList-r16                                SetupRelease {WLAN-NameList-r16}
                                                             OPTIONAL, -- Need M
    sensorNameList-r16                              SetupRelease {Sensor-NameList-r16}
                                                             OPTIONAL, -- Need M
    obtainCommonLocation-r16                        ENUMERATED {true}    OPTIONAL, -- Need R
    sl-AssistanceConfigNR-r16                       ENUMERATED {true}    OPTIONAL, -- Need R
    pagingPreferenceConfig                          SetupRelease {PagingPreferenceConfig}
                                                             OPTIONAL
}
PagingPreference-Config ::=                      SEQUENCE {
    pagingPreferenceProhibitTimer                   ENUMERATED {
                                                        s0, sodot5, s1, s2, s3, s4, s5, s6, s7,
                                                        s8, s9, s10, s20, s30, spare2, spare1}
}
```

Alternatively, system Information may be used to configure paging assistance reporting in the cell. For example, the paging preference configuration information may be signaled as a PagingPreferenceReporting field included in the PCCH-Config IE as shown in Table 10.

TABLE 10

```
PCCH-Config ::=                      SEQUENCE {
    defaultPagingCycle                  PagingCycle,
    nAndPagingFrameOffset               CHOICE {
    oneT                                NULL,
    halfT                               INTEGER (0..1),
    quarterT                            INTEGER (0..3),
    oneEighthT                          INTEGER (0..7),
    oneSixteenthT                       INTEGER (0..15)
    },
    Ns                               ENUMERATED {four, two, one},
    firstPDCCH-MonitoringOccasionOfPO              CHOICE {
        sCS15KHZoneT
                            SEQUENCE (SIZE (1..maxPO-perPF)) OF INTEGER (0..139),
        sCS30KHZoneT-SCS15KHZhalfT
                            SEQUENCE (SIZE (1..maxPO-perPF)) OF INTEGER (0..279),
        sCS60KHZoneT-SCS30KHZhalfT-SCS15KHZquarterT
                            SEQUENCE (SIZE (1..maxPO-perPF)) OF INTEGER (0..559),
        sCS120KHZoneT-SCS60KHZhalfT-SCS30KHZquarterT-SCS15KHZoneEighthT
                            SEQUENCE (SIZE (1..maxPO-perPF)) OF INTEGER (0..1119),
        sCS120KHZhalfT-SCS60KHZquarterT-SCS30KHZoneEighthT-SCS15KHZoneSixteenthT
                            SEQUENCE (SIZE (1..maxPO-perPF)) OF INTEGER (0..2239),
        sCS120KHZquarterT-SCS60KHZoneEighthT-SCS30KHZoneSixteenthT
                            SEQUENCE (SIZE (1..maxPO-perPF)) OF INTEGER (0..4479),
        sCS120KHZoneEighthT-SCS60KHZoneSixteenth
                            SEQUENCE (SIZE (1..maxPO-perPF)) OF INTEGER (0..8959),
        sCS120KHZoneSixteenthT
                        SEQUENCE (SIZE (1..maxPO-perPF)) OF INTEGER (0..17919)
    } OPTIONAL,           -- Need R
```

TABLE 10-continued

```
...,
[[
    nrofPDCCH-MonitoringOccasionPerSSB-InPO-r16
                                    INTEGER (2..4)      OPTIONAL      -- Cond SharedSpectrum2
]],
    pagingPreferenceReporting        ENUMERATED {true]              OPTIONAL
}
```

Higher layer signaling (e.g., NAS, RRC) may be used to report paging preference/assistance information, wherein the paging preference/assistance information may be reported upon detecting a change in the paging preference/assistance information, periodically, upon request from the network or based on predefined or (pre-)configured criteria or conditions. An example of a preconfigured condition may be if the UE received "K" consecutive pages without finding its identity in the paging message, (e.g., "K" false alarms) then UE 201 may realize it is in the wrong group and transmit assistance info to gNB 203.

In one example, a UEAssistanceInformation message is used to report paging preference/assistance information. The UEAssistanceInformation message may include a PagingPreference IE, such as the one shown in Table 11, to signal the paging preference/assistance information.

TABLE 11

```
UEAssistanceInformation-v1610-IEs ::= SEQUENCE {
    idc-Assistance-r16                IDC-Assistance-r16                OPTIONAL,
    drx-Preference-r16                DRX-Preference-r16                OPTIONAL,
    maxBW-Preference-r16              MaxBW-Preference-r16              OPTIONAL,
    maxCC-Preference-r16              MaxCC-Preference-r16              OPTIONAL,
    maxMIMO-LayerPreference-r16       MaxMIMO-LayerPreference-r16       OPTIONAL,
    minSchedulingOffsetPreference-r16 MinSchedulingOffsetPreference-r16 OPTIONAL,
    OPTIONAL,
    releasePreference-r16             ReleasePreference-r16             OPTIONAL,
    sl-UE-AssistanceInformationNR-r16                                   SL-UE-
AssistanceInformationNR-r16        OPTIONAL,
    referenceTimeInfoPreference-r16   BOOLEAN                          OPTIONAL,
    paging-Preference                 Paging-Preference                OPTIONAL,
    nonCriticalExtension              SEQUENCE { }                     OPTIONAL
}
Paging-Preference ::= SEQUENCE {
    expectedMobilityBehaviour
    ENUMERATED {STATIONARY, NOMADIC, MOBILE, spare}
    OPTIONAL,
    detectedMobilityState             ENUMERATED {NORMAL, MEDIUM, HIGH, spare}
    OPTIONAL
    preferredPagingGroup              INTEGER {1..maxPagingGroups)
    OPTIONAL,
}
```

Figure 4:
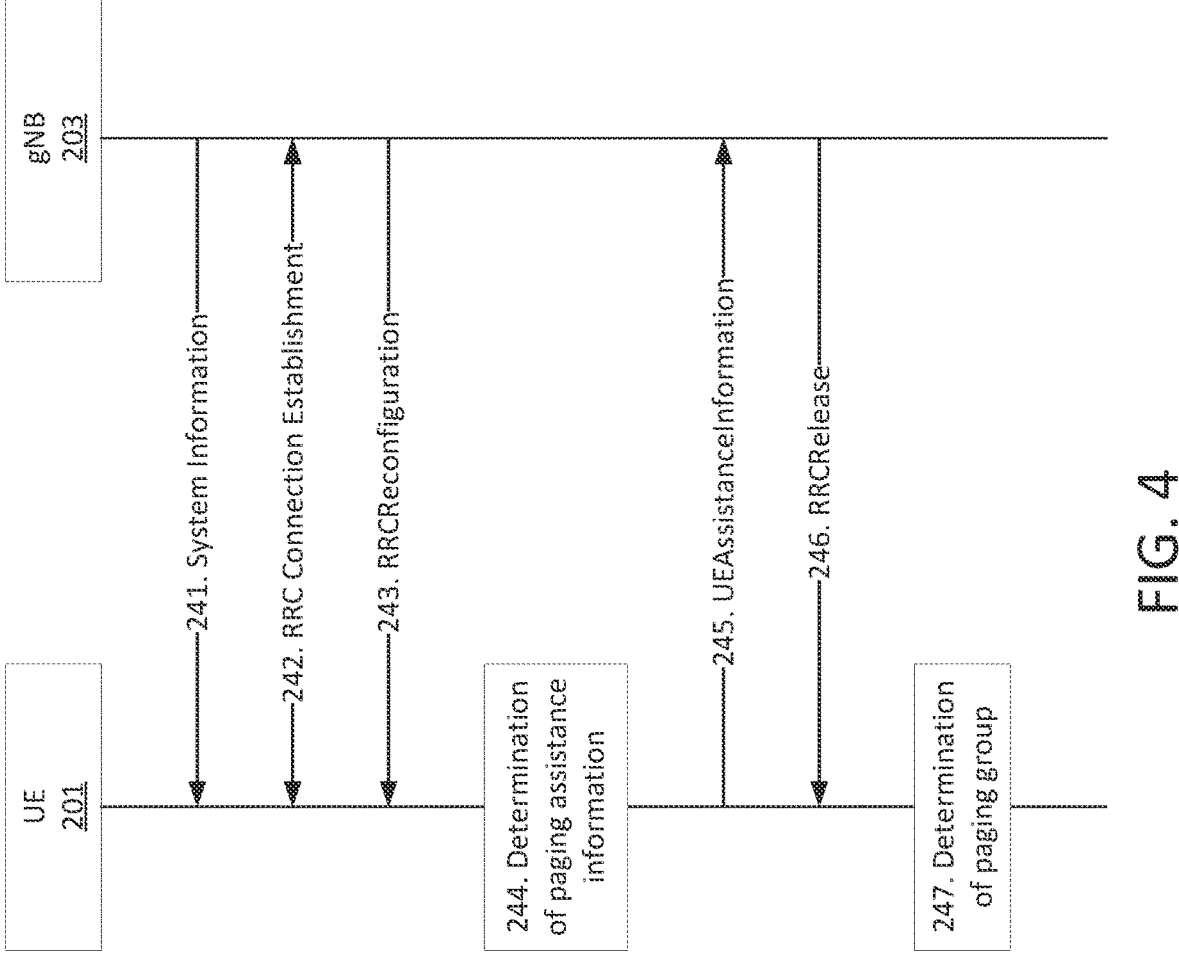
FIG. 4 illustrates UE-Assisted Paging Group Determination.

An exemplary signaling diagram for UE-assisted paging group determination is shown in FIG. 4. At step 241, UE 201 receives system information comprising the paging configuration and other configuration parameters for the cell. At step 242, UE 201 establishes an RRC connection. At step 243, UE 201 receives an RRCReconfiguration message comprising paging preference configuration information (e.g., a PagingPreferenceConfig IE). At step 244, UE 201 determines paging assistance information, wherein the paging assistance information may correspond with the expected mobility behaviour, the detected mobility state, the preferred paging group, etc. At step 245, UE 201 transmits a UEAssistanceInformation message that includes paging preference information (e.g., a PagingPreference IE). The type of assistance information may be based on request (e.g., part of the paging preference configuration information, preconfigured or defined per the standard). At step 246, UE 201 receives an RRCRelease message comprising paging assistance information. At step 247, UE 201 determines its paging group based, at least in part, on the paging assistance information provided by gNB 203.

DCI-Based Approaches

For DCI-Based approaches the paging group(s) being paged is(are) indicated via the Paging DCI. The indication may be implemented using one or more of the reserved bits in the paging DCI. Table 12 is an example of a paging DCI definition where 4 bits are used to indicate the paging group, although the same concepts can be applied for approaches using a different number of bits. The paging group field may be defined such that bit 1 corresponds to paging group 1, bit 2 corresponds to paging group 2, and so on. A value of '1' for a given bit may be used to indicate the paging group is being paged. More than 1 bit may be set to page multiple paging groups.

And in another example, the paging group field may be interpreted as integer value, where each integer value corresponds to a different paging group. With this method, one paging group may be paged at a time. A reserved value (e.g., the maximum value) may be used to indicate all groups are paged.

TABLE 12

Exemplary Paging DCI Including Paging Group Information

| Field Name | # Bits | Comment |
|---|---|---|
| Short Messages Indicator | 2 | As defined in Table 2. |
| Short Messages | 8 | If only the scheduling information for Paging is carried, this bit field is reserved. |
| Frequency domain resource assignment | $\lceil \log_2 (N_{RB}^{DL,BWP}(N_{RB}^{DL,BWP}+1)/2) \rceil$ | If only the short message is carried, this bit field is reserved. |
| Time domain resource assignment | 4 | As defined in section 5.1.2.1 of TS 38.214 [5]. If only the short message is carried, this bit field is reserved. |
| VRB-to-PRB mapping | 1 | As defined in Table 7.3.1.1.2-33 of TS 38.212 [4]. If only the short message is carried, this bit field is reserved. |
| Modulation and coding scheme | 5 | As defined in section 5.1.3 of TS 38.214 [5]. If only the short message is carried, this bit field is reserved. |
| TB scaling | 2 | As defined in section 5.1.3.2 of [5]. If only the short message is carried, this bit field is reserved. |
| Paging Group | 4 | Indicates which paging groups are being paged. Bit 1 corresponds to paging group 1, bit 2 to paging group 2 and so on. |
| Reserved | 2 or 4 | 4 bits for operation in a cell with shared spectrum channel access; otherwise 4 bits |

The paging false alarm rate is inversely proportional to the number of paging groups. Using all the reserved bits for the paging group may allow a maximum number of paging groups to be supported. However, this may not allow for extension of the paging DCI for other purposes.

To provide support for additional paging groups without consuming all the reserved bits, we disclose to make use of the short messages bits to signal paging group information when only scheduling information for paging is carried in the in the paging DCI.

For example, the paging DCI could be comprised of a primary paging group field that is always present in the paging DCI and secondary paging group field, corresponding to one or more bits of the short messages field that is only present when the short message is not carried in the paging DCI as shown in Table 13. In this example, a value of 1 for the short messages indicator, which corresponds to "Only scheduling information for Paging is present in the DCI," may be used to indicate the presence of secondary paging group information in the paging DCI.

TABLE 13

Exemplary Paging DCI Including Primary Paging Group and Secondary Paging Group Information

| Field Name | # Bits | Comment |
|---|---|---|
| Short Messages Indicator | 2 | As defined in Table 2. |
| Short Messages/Secondary Paging Group | 8 | If only the scheduling information for Paging is carried, this bit field indicates which secondary paging groups are being paged. Bit 1 corresponds to secondary paging group 1, bit 2 to secondary paging group 2 and so on. |

TABLE 13-continued

Exemplary Paging DCI Including Primary Paging Group and Secondary Paging Group Information

| Field Name | # Bits | Comment |
|---|---|---|
| Frequency domain resource assignment | $\lceil \log_2 \left( N_{RB}^{DL,BWP} \left( N_{RB}^{DL,BWP} + 1 \right) / 2 \right) \rceil$ | If only the short message is carried, this bit field is reserved. |
| Time domain resource assignment | 4 | As defined in section 5.1.2.1 of TS 38.214 [5]. If only the short message is carried, this bit field is reserved. |
| VRB-to-PRB mapping | 1 | As defined in Table 7.3.1.1.2-33 of TS 38.212 [4]. If only the short message is carried, this bit field is reserved. |
| Modulation and coding scheme | 5 | As defined in section 5.1.3 of TS 38.214 [5]. If only the short message is carried, this bit field is reserved. |
| TB scaling | 2 | As defined in section 5.1.3.2 of [5]. If only the short message is carried, this bit field is reserved. |
| Primary Paging Group | 4 | Indicates which primary paging groups are being paged. Bit 1 corresponds to primary paging group 1, bit 2 to primary paging group 2 and so on. |
| Reserved | 2 or 4 | 4 bits for operation in a cell with shared spectrum channel access; otherwise 4 bits |

And in another example, a value of '0' for the short messages indicator, may be used to indicate the presence of scheduling information for paging and secondary paging group information in the paging DCI, while a value of '1' would indicate the presence of scheduling information for paging without secondary paging group information, as shown in Table 14.

TABLE 14

Exemplary Short Message Indicator Used to Indicate the Presence of Secondary Paging Group Information

| Bit Field | Description |
|---|---|
| 00 | Only scheduling information for paging without secondary paging group information is present in the DCI |
| 01 | Only scheduling information for paging with secondary paging group information is present in the DCI |
| 10 | Only short message is present in the DCI |
| 11 | Both scheduling information for paging and short message are present in the DCI |

And in another alternative, one or more of the reserved bits in the short message may be used to signal the paging group.

There may be a paging group field in which the number of bits in the field are indicated dynamically via another field in the paging DCI.

Figure 5:
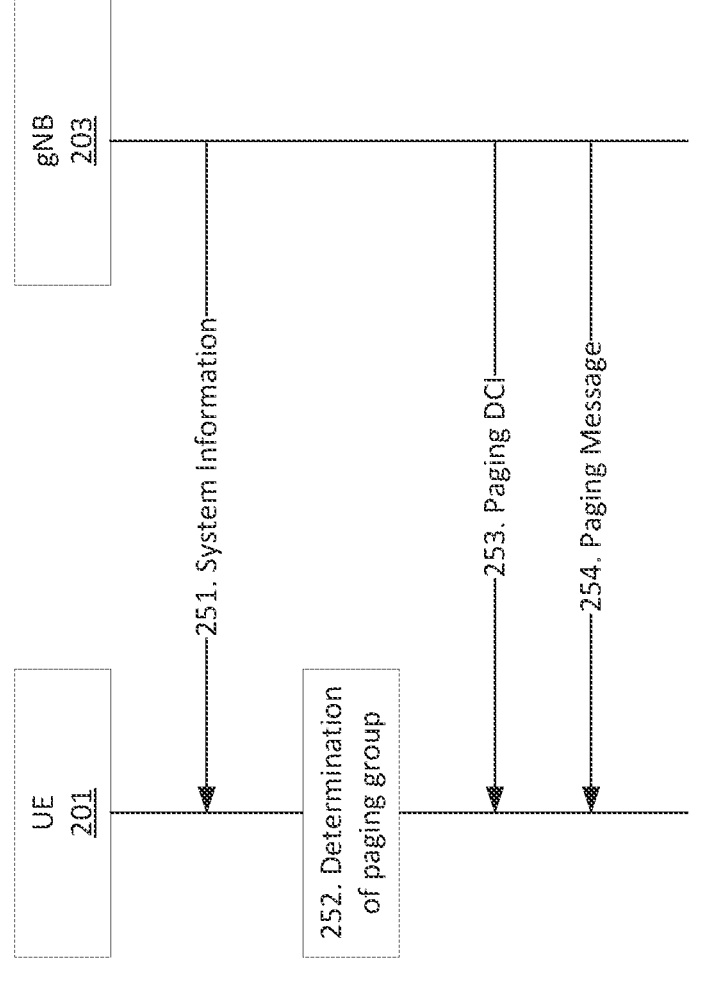
FIG. 5 illustrates DCI-Based Group Paging.

An exemplary signaling diagram for DCI-Based Group Paging is shown in FIG. 5. At step 251, UE 201 receives system information comprising the paging configuration and other configuration parameters for the cell, and determines its PO. At step 252, UE 201 determines the paging group using any of the mechanisms described herein. At step 253, UE 201 monitors for paging during its determined PO and receives paging DCI that may include an indication that the paging group associated with UE 201 is being paged and scheduling information for a PDSCH carrying a paging message. Note: If UE 201 determines its paging group is not being paged, UE 201 may enter DRX.

With continued reference to FIG. 5, for scenarios where UE 201 is configured with a primary paging group and a secondary paging group, and the paging DCI does not include a field to indicate secondary paging group information, UE 201 determines its paging group is being paged if the primary paging group information in the Paging DCI corresponds to the primary paging group associated with UE 201.

For scenarios where UE 201 is configured with a primary paging group and a secondary paging group, and the paging DCI includes a field to indicate secondary paging group information, UE 201 determines its paging group is being paged if the primary paging group information in the paging DCI corresponds to the primary paging group associated with UE 201 and the secondary paging group information in the paging DCI corresponds to the secondary paging group associated with UE 201. Note that if UE 201 determines its paging group is not being paged, UE 201 may enter DRX.

At step 254, UE 201 receives the paging message carried on the PDSCH scheduled by the scheduling information in the paging DCI.

P-RNTI-Based Approaches

For P-RNTI-Based approaches, the paging group(s) being paged is(are) indicated via the RNTI used to address the PDCCH transmissions carrying the paging DCI. A plurality of RNTIs, e.g., P-RNTI$_1$, P-RNTI$_2$, etc. each associated with a different paging group is defined. For example, P-RNTI$_1$ may be associated with Paging Group 1, P-RNTI$_2$ may be associated with Paging Group 2, etc. UE 201 configured for a given paging group would monitor for a PDCCH addressed to the RNTI associated with its paging group during its PO to receive the paging DCI. Approaches where a given RNTI is associated with multiple paging groups may also be envisaged. The plurality of RNTIs used for group-based paging may be defined per the specification or signaled via broadcast or dedicated signaling.

Figure 6:
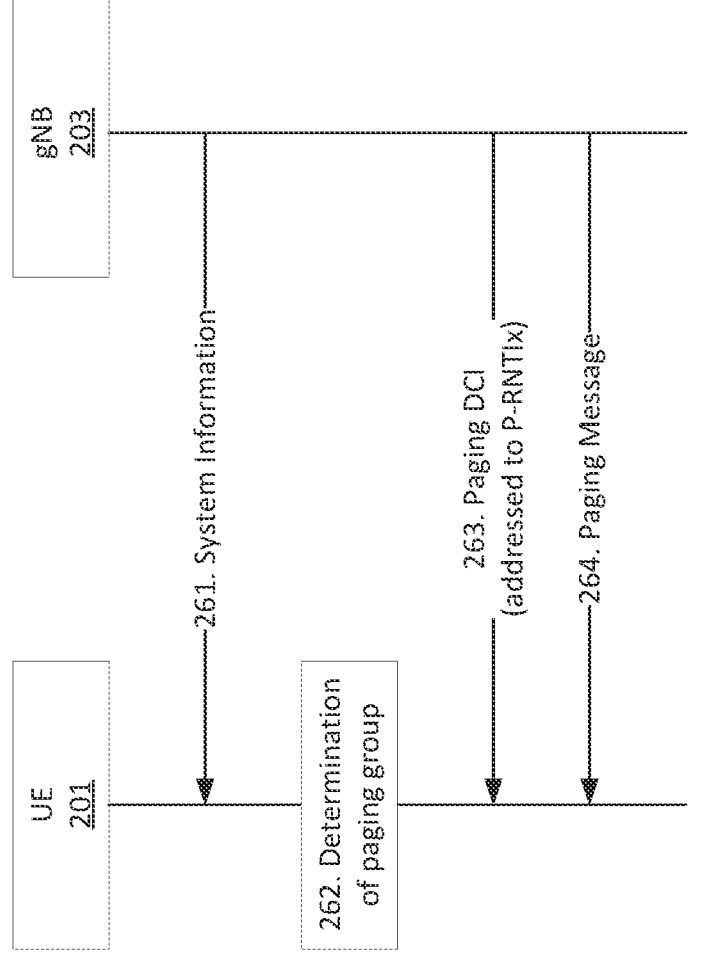
FIG. 6 illustrates P-RNTI-Based Group Paging.

An exemplary signaling diagram for P-RNTI-based group paging is shown in FIG. 6. At step 261, UE 201 receives system information that includes the paging configuration and other configuration parameters for the cell, and determines its PO. At step 262, UE 201 determines the paging group using any of the mechanisms described herein. At step 263, UE 201 monitors for a PDCCH addressed to the RNTI associated with its paging group during its determined PO and receives paging DCI that includes scheduling information for a PDSCH carrying a paging message. At step 264, UE 201 receives the paging message carried on the PDSCH scheduled by the scheduling information in the paging DCI.

In some scenarios, network 202 may have to page all UEs during a given PO, e.g. when transmitting a short message indicating a systemInfoModification or an etwsAndCmasIndication. If the UEs monitoring a given PO are assigned to different paging groups, network 202 would need to transmit multiple PDCCHs, each addressed to a different RNTI, to page all the UEs. This may be inefficient from a network resources standpoint and may not be possible depending on how many RNTIs are defined and the size of CORESET used to receive the PDCCH carrying the paging DCI. And it is not acceptable to delay the paging for one or more groups until the next DRX cycle. To resolve this problem, UE 201 may monitor a second RNTI that may be used to page all associated UEs during its PO. This RNTI may correspond to special value specified per the standards, e.g., the legacy 0xFFFE P-RNTI value. Alternatively, the RNTI used for paging all UEs may be signaled via broadcast or dedicated signaling. UE 201 would then monitor for a PDCCH addressed to the first RNTI or the second RNTI during the determined PO and could be paged using either RNTI. The paging DCI addressed to the second RNTI may include short messages or scheduling information for a PDSCH carrying the paging message.

WUS-Based Approaches

In this approach the paging group(s) being paged is(are) indicated via a Wakeup Signal (WUS) that is transmitted prior to the Paging DCI. If the UE receives a WUS indicating its paging group is being paged, the UE monitors for paging during subsequent PO; and if the UE receives a WUS indicating its paging group is not being paged, the UE does not monitor for paging during its subsequent PO. The WUS monitoring occurs prior to the determined PO, where the offset between the WUS and the PO may be configured via RRC signaling. Alternatively, the offset may be determined based on the paging group associated with the UE.

Figure 7:
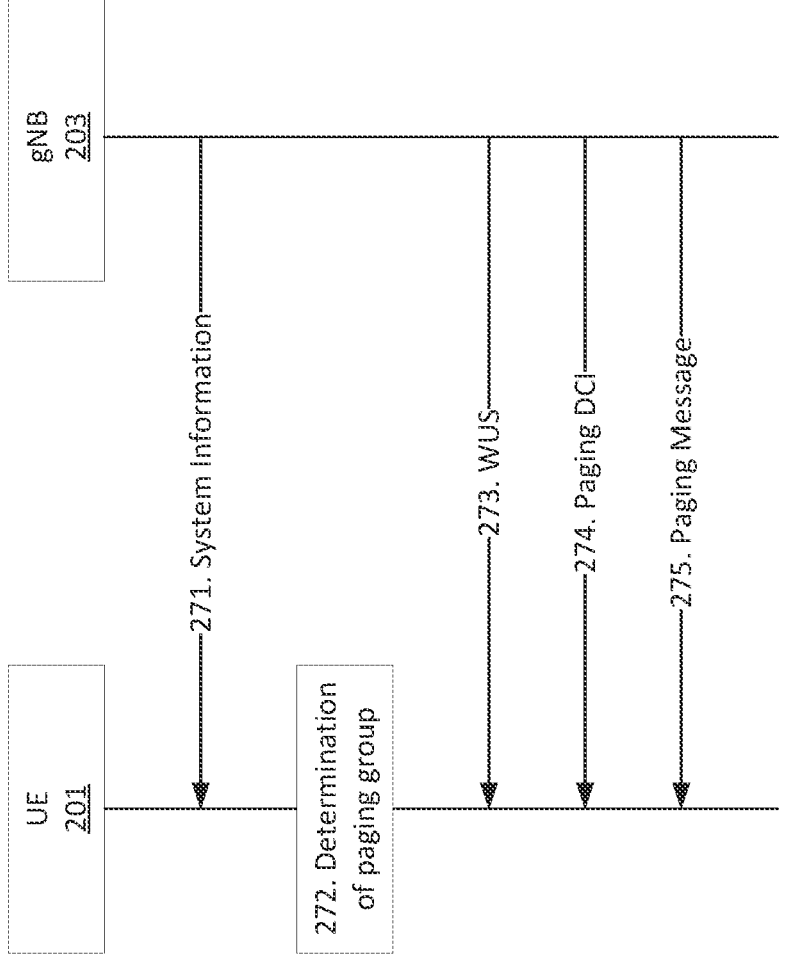
FIG. 7 illustrates WUS-Based Group Paging.

An exemplary signaling diagram for WUS-Based Group Paging is shown in FIG. 7. At step 271, UE 201 receives system information that may include the WUS configuration, the paging configuration and other configuration parameters for the cell, and determines its PO. At step 272, UE 201 determines the paging group using any of the mechanisms described herein. At step 273, UE 201 monitors for a WUS during a WUS monitoring occasion and receives a WUS indicating its paging group is being paged. At step 274, UE 201 monitors for paging during its determined PO and receives paging DCI that includes scheduling information for a PDSCH carrying a paging message. At step 275, UE 201 receives the paging message carried on the PDSCH scheduled by the scheduling information in the paging DCI.

Sweep-Based Approaches

Figure 8:
FIG. 8 illustrates PO Definition for Sweep-Based Group Paging.

When SearchSpaceId other than 0 is configured for pagingSearchSpace, a PO is defined as a set of 'S*X' consecutive PDCCH monitoring occasions where 'S' is the number of actual transmitted SSBs determined according to ssb-PositionsInBurst in SIB1 and X is the nrofPDCCH-MonitoringOccasionPerSSB-InPO if configured or is equal to 1 otherwise. In this approach the paging group(s) being paged is(are) indicated via different subsets of the set of 'S*X' PDCCH monitoring occasions comprising a PO as shown in FIG. 8. These different subsets may also be viewed as different paging sweeps. UE 201 configured for a given paging group would monitor the subset of PDCCH monitoring occasions associated with its paging group during its PO to receive the paging DCI.

Figure 9:
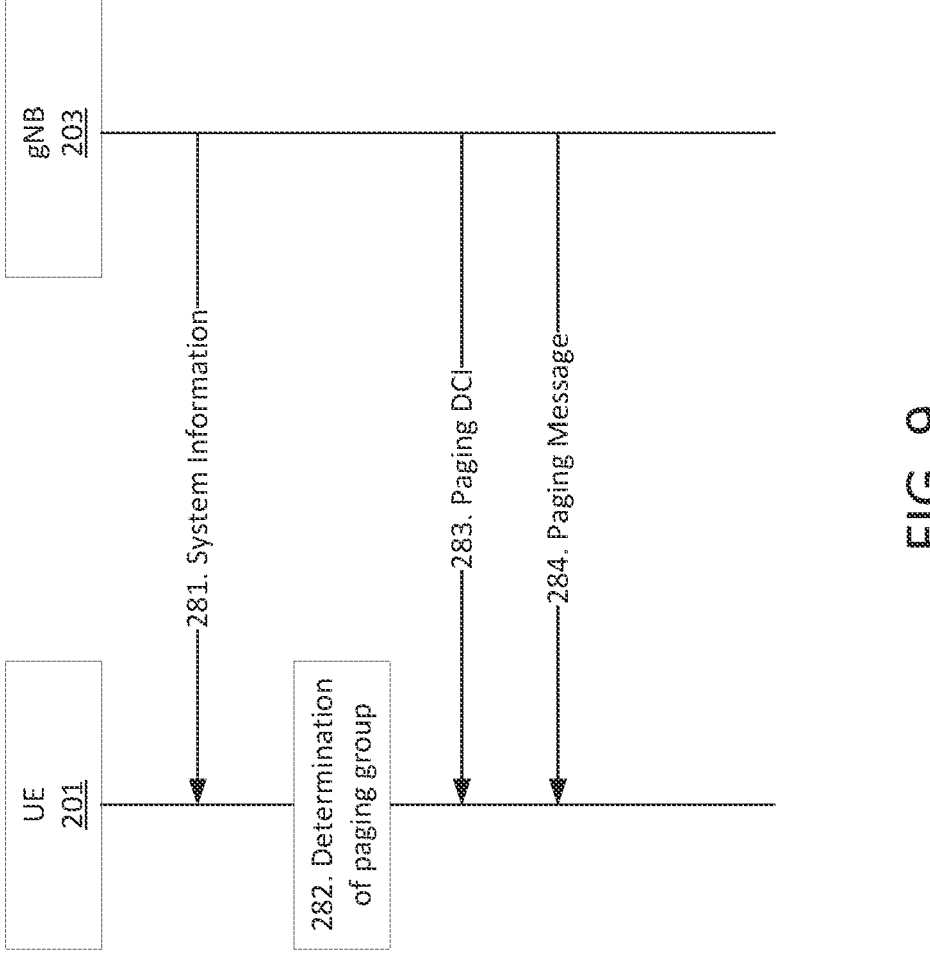
FIG. 9 illustrates Sweep-Based Group Paging.

An exemplary signaling diagram for sweep-based group paging is shown in FIG. 9. At step 281, UE 201 receives system information comprising the paging configuration and other configuration parameters for the cell, and determines its PO. At step 282, UE 201 determines the paging group using any of the mechanisms described herein. At step 283, UE 201 monitors for paging on the subset of PDCCH monitoring occasions associated with its paging group during its PO and receives paging DCI comprising scheduling information for a PDSCH carrying a paging message. At step 284, UE 201 receives the paging message carried on the PDSCH scheduled by the scheduling information in the paging DCI.

Beam-Based Paging

Figure 10:
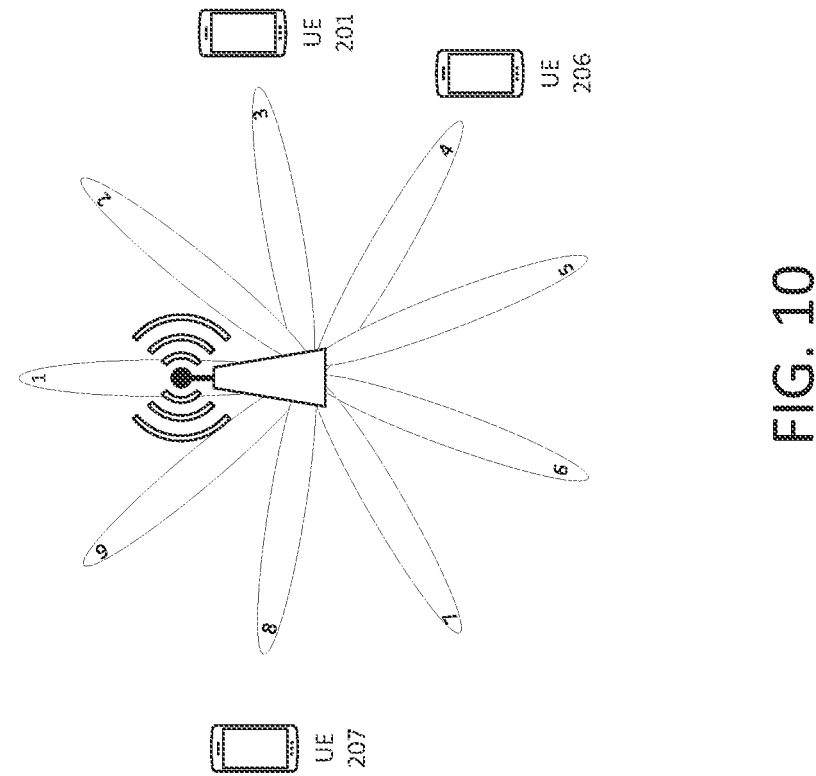
FIG. 10 illustrates Cell Configured for Multi-Beam Operation.

Paging for NR may be performed using a plurality of beams, where each beam provides coverage in a different area of the cell. FIG. 10 is an illustration of a cell configured for multi-beam operation, wherein UE 201, UE 206 and UE 207 are in different coverage areas of the cell. In multi-beam operations, the same paging message and Short Message are repeated in all transmitted beams. To reduce the paging false alarm rate, network 102 may use beam-based paging, where the paging for a given UE 201 is only transmitted in the beam(s) being monitored by UE 201 to receive paging. If we consider the scenario shown in FIG. 10, when paging UE 201, the paging may only be transmitted in beam 3.

To enable beam-based paging, UE 201 reports paging assistance information to inform the network 202, e.g., the gNB 203, of the beams it intends to monitor for paging. Dedicated or broadcast signaling may be used to configure UE 201 to report paging assistance information for beam-based paging. Exemplary IEs that may be used are shown in Table 8, Table 9, and Table 10.

Whether or not beam-based paging is configured may depend on the device mobility, e.g., if it is a stationary, nomadic, or low mobility device. The mobility state of the device (e.g., UE 201) may be reported to network 202 so it may be used by network 202 when determining whether or not UE 201 should be configured for beam-based paging. Alternatively, network 202 may determine this based on subscription information.

UE 201 configured to report paging assistance information for beam-based paging may determine a preferred PDCCH monitoring occasion paging from the set of PDCCH monitoring occasions configured for the UEs PO. The preferred PDCCH monitoring occasion may be determined based on DL measurements performed by UE 201. For example, the preferred PDCCH monitoring occasion for paging may be the one that corresponds to the SSB with the largest RSRP measurement. In another example, the preferred PDCCH monitoring for paging may be any PDCCH monitoring occasion for paging above a threshold, where the threshold may be configured by the network or specified per the standard.

The paging assistance information may be reported to the network, via higher layer signaling, e.g. MAC CE, RRC, NAS. In one example, a UEAssistanceInformation message may be used to report paging assistance information.

The paging preference information may correspond to the index of the preferred PDCCH monitoring occasion for paging, wherein the index of a PDCCH monitoring occasion for paging UE 201 may monitor corresponds to the index K of the corresponding transmitted SSB, wherein the $[x*S+K]^{th}$ PDCCH monitoring occasion for paging in the PO corresponds to the $K^{th}$ transmitted SSB, where x=0, 1, . . . , X−1, K=1, 2, . . . , S, where 'S' is the number of actual transmitted SSBs and X is the number of PDCCH monitoring occasions per SSB in a PO if configured or is equal to 1 otherwise.

The UEAssistanceInformation message may include a PagingPreference IE, such as the one shown in Table 15, to signal the paging preference information corresponding to the index of the preferred PDCCH monitoring occasion for paging.

TABLE 15

| UEAssistanceInformation-v1610-IEs ::= SEQUENCE { | | |
|---|---|---|
| idc-Assistance-r16 | IDC-Assistance-r16 | OPTIONAL, |
| drx-Preference-r16 | DRX-Preference-r16 | OPTIONAL, |
| maxBW-Preference-r16 | MaxBW-Preference-r16 | OPTIONAL, |
| maxCC-Preference-r16 | MaxCC-Preference-r16 | OPTIONAL, |
| maxMIMO-LayerPreference-r16 | MaxMIMO-LayerPreference-r16 | OPTIONAL, |
| minSchedulingOffsetPreference-r16 | MinSchedulingOffsetPreference-r16 | |
| OPTIONAL, | | |
| releasePreference-r16 | ReleasePreference-r16 | OPTIONAL, |
| sl-UE-AssistanceInformationNR-r16 | | SL-UE- |
| AssistanceInformationNR-r16 | OPTIONAL, | |
| referenceTimeInfoPreference-r16 | BOOLEAN | OPTIONAL, |
| paging-Preference | Paging-Preference | OPTIONAL, |
| nonCriticalExtension | SEQUENCE { } | OPTIONAL |
| } | | |
| Paging-Preference ::= SEQUENCE { | | |
| indexOfpreferredPDCCHMonitoringOccasion INTEGER (1..64) | | OPTIONAL |
| } | | |

A UE capable of providing its preference on the PDCCH monitoring occasion for paging may initiate the procedure in several cases, if it was configured to do so, including upon having a preference on the PDCCH monitoring occasion for paging and upon change of its preference on the PDCCH monitoring occasion for paging. A network configured prohibit timer may be used to control how often paging preference information is reported.

The following is an exemplary procedure for reporting paging assistance information.

Upon initiating the procedure, UE 201 shall:

1> if configured to provide its preference on the PDCCH monitoring occasion for paging:

2> if the UE 201 has a preference on the PDCCH monitoring occasion for paging and the UE did not transmit a UEAssistanceInformation message with paging-Preference since it was configured to provide its preference on the PDCCH monitoring occasion for paging; or 2> if the current paging-Preference information is different from the one indicated in the last transmission of the UEAssistanceInformation message and timer T346x is not running:

3> start the timer T346x with the timer value set to the pagingPreferenceProhibitTimer;

3> initiate transmission of the UEAssistanceInformation message in accordance with the procedure to set the contents of the UEAssistanceInformation message to provide the current paging-Preference.

The UE 201 shall set the contents of the UEAssistanceInformation message as follows:

1> if transmission of the UEAssistanceInformation message is initiated to provide paging-Preference:

2> include paging-Preference in the UEAssistanceInformation message;

2> set indexOfpreferredPDCCHMonitoringOccasion to the index of the SSB corresponding to the preferred PDCCH monitoring occasion for paging;

1> submit the UEAssistanceInformation message to lower layers in accordance with the procedure defined in section 5.7.4.3 of 3GPP TS 38.331 [2].

Figure 11:
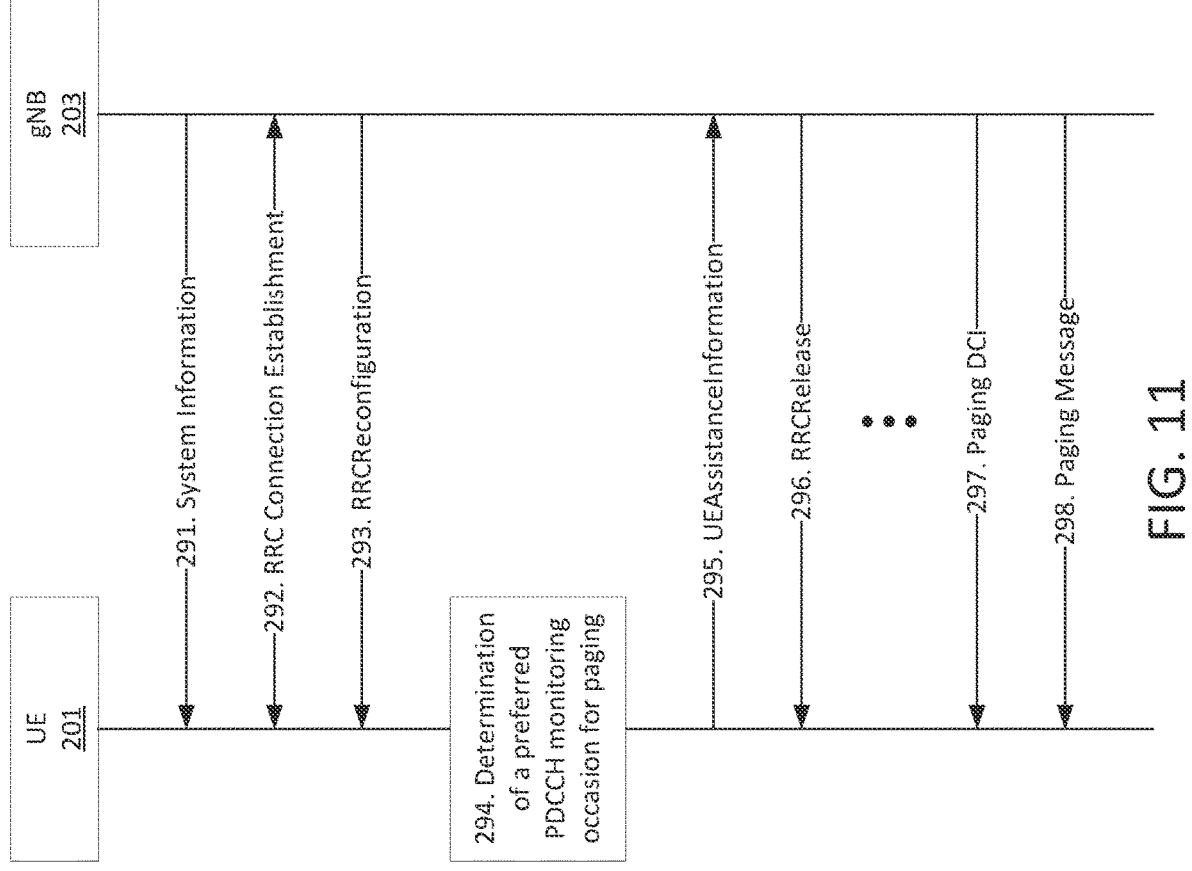
FIG. 11 illustrates Beam-Based Paging.

An exemplary signaling diagram for a Beam-Based Paging is shown in FIG. 11. At step 291, UE 201 receives system information comprising the paging configuration and other configuration parameters for the cell. At step 292, UE 201 establishes an RRC connection. At step 293, UE 201 receives an RRCReconfiguration message comprising paging preference configuration information, e.g., a PagingPreferenceConfig IE. At step 294, UE 201 determines a preferred PDCCH monitoring occasion for paging. At step 295, UE 201 transmits a UEAssistanceInformation message comprising paging preference information, e.g., a PagingPreference IE. At step 296, UE 201 receives an RRCRelease message, transitions to RRC_IDLE/RRC_INACTIVE and begins to monitor for paging during the preferred PDCCH monitoring occasion for paging. At step 297, UE 201 receives paging DCI during the preferred PDCCH monitoring occasion for paging. At step 298, if the paging DCI includes scheduling information, UE 201 receives the paging message carried on the PDSCH scheduled by the scheduling information in the paging DCI.

And other examples, the UEAssistance information may be signaled via small data transmission without requiring UE 201 to transition to the RRC CONNETED state.

Considerations of Statement #2

Cross-Slot Scheduling for Paging

To reduce power consumption for scenarios where the paging DCI does not include scheduling information, the slot offset between the Paging DCI and its scheduled PDSCH may be semi-statically configured. For scenarios where the slot offset is greater than 0, UE 201 may then only power on the PDCSH receiver hardware if the paging DCI includes scheduling information.

The slot offset between the paging DCI and its scheduled PDSCH may be signaled via broadcast or dedicated signaling. For example, the slot offset may be signaled as a k0 field included in the PCCH-Confit IE as shown in Table 16.

TABLE 16

```
PCCH-Config ::=          SEQUENCE {
  defaultPagingCycle        PagingCycle,
  nAndPagingFrameOffset       CHOICE {
  oneT                NULL,
  halfT               INTEGER (0..1),
  quarterT              INTEGER (0..3),
  oneEighthT             INTEGER (0..7),
  oneSixteenthT            INTEGER (0..15)
  },
  Ns                ENUMERATED {four, two, one},
  firstPDCCH-MonitoringOccasionOfPO        CHOICE {
    sCS15KHZoneT
                  SEQUENCE (SIZE (1..maxPO-perPF)) OF INTEGER (0..139),
    sCS30KHZoneT-SCS15KHZhalfT
                  SEQUENCE (SIZE (1..maxPO-perPF)) OF INTEGER (0..279),
    sCS60KHZoneT-SCS30KHZhalfT-SCS15KHZquarterT
                  SEQUENCE (SIZE (1..maxPO-perPF)) OF INTEGER (0..559),
    sCS120KHZoneT-SCS60KHZhalfT-SCS30KHZquarterT-SCS15KHZoneEighthT
                  SEQUENCE (SIZE (1..maxPO-perPF)) OF INTEGER (0..1119),
    sCS120KHZhalfT-SCS60KHZquarterT-SCS30KHZoneEighthT-SCS15KHZoneSixteenthT
                  SEQUENCE (SIZE (1..maxPO-perPF)) OF INTEGER (0..2239),
    sCS120KHZquarterT-SCS60KHZoneEighthT-SCS30KHZoneSixteenthT
                  SEQUENCE (SIZE (1..maxPO-perPF)) OF INTEGER (0..4479),
    sCS120KHZoneEighthT-SCS60KHZoneSixteenth
                  SEQUENCE (SIZE (1..maxPO-perPF)) OF INTEGER (0..8959),
    sCS120KHZoneSixteenthT
                  SEQUENCE (SIZE (1..maxPO-perPF)) OF INTEGER (0..17919)
  } OPTIONAL,        -- Need R
  ...,
  [[
    nrofPDCCH-MonitoringOccasionPerSSB-InPO-r16
                  INTEGER (2..4)       OPTIONAL -- Cond SharedSpectrum2
  ]],
  k0                INTEGER(0..32)        OPTIONAL
}
```

Alternatively, the PCCH-Config IE could include a time-DomainResourceAssignment field that is used look up the corresponding configuration from the PDSCH-TimeDomainResourceAllocationList and obtain the value of the k0 to be applied as shown in Table 17.

TABLE 17

```
PCCH-Config ::=          SEQUENCE {
  defaultPagingCycle        PagingCycle,
  nAndPagingFrameOffset       CHOICE {
  oneT                NULL,
  halfT               INTEGER (0..1),
  quarterT              INTEGER (0..3),
  oneEighthT             INTEGER (0..7),
  oneSixteenthT            INTEGER (0..15)
  },
  Ns                ENUMERATED {four, two, one},
  firstPDCCH-MonitoringOccasionOfPO          CHOICE {
    sCS15KHZoneT
                  SEQUENCE (SIZE (1..maxPO-perPF)) OF INTEGER (0..139),
    sCS30KHZoneT-SCS15KHZhalfT
                  SEQUENCE (SIZE (1..maxPO-perPF)) OF INTEGER (0..279),
    sCS60KHZoneT-SCS30KHZhalfT-SCS15KHZquarterT
                  SEQUENCE (SIZE (1..maxPO-perPF)) OF INTEGER (0..559),
    sCS120KHZoneT-SCS60KHZhalfT-SCS30KHZquarterT-SCS15KHZoneEighthT
                  SEQUENCE (SIZE (1..maxPO-perPF)) OF INTEGER (0..1119),
    sCS120KHZhalfT-SCS60KHZquarterT-SCS30KHZoneEighthT-SCS15KHZoneSixteenthT
                  SEQUENCE (SIZE (1..maxPO-perPF)) OF INTEGER (0..2239),
    sCS120KHZquarterT-SCS60KHZoneEighthT-SCS30KHZoneSixteenthT
```

TABLE 17-continued

```
                   SEQUENCE (SIZE (1..maxPO-perPF)) OF INTEGER (0..4479),
    sCS120KHZoneEighthT-SCS60KHZoneSixteenth
                   SEQUENCE (SIZE (1..maxPO-perPF)) OF INTEGER (0..8959),
    sCS120KHZoneSizteenthT
                   SEQUENCE (SIZE (1..maxPO-perPF)) OF INTEGER (0..17919)
} OPTIONAL,             -- Need R
...,
[[
    nrofPDCCH-MonitoringOccasionPerSSB-InPO-r16
                   INTEGER (2..4)          OPTIONAL -- Cond SharedSpectrum2
]],
    timeDomainResourceAssignment              INTEGER(0..15)  OPTIONAL
}
```

For scenarios where the slot offset between the paging DCI and its scheduled PDSCH is semi-statically configured, the Time Domain Resource Assignment field may not be needed in the paging DCI and the bits may instead be used for another purpose, e.g., to signal paging group information.

In another alternative, a field may be introduced to indicate whether or not cross-slot scheduling is configured, but the actual value of k0 is still dynamically indicated by signaling the Time Domain Resource Assignment field in the paging DCI and determining the value of k0 from the corresponding allocation table.

It is understood that the entities performing the steps illustrated herein may be logical entities. The steps may be stored in a memory of, and executing on a processor of, a device, server, or computer system such as those illustrated in FIG. 13F or FIG. 13G. Skipping steps, combining steps, or adding steps between exemplary methods disclosed herein is contemplated.

Table 18 provides abbreviations and definitions as disclosed herein.

TABLE 18

Abbreviations and Definitions

| Abbreviations | Definitions |
|---|---|
| 5GC | 5G Core |
| BWP | Bandwidth Part |
| CMAS | Commercial Mobile Alert Service |
| CN | Core Network |
| CORESET | Control Resource Set |
| CRC | Cyclic Redundancy Check |
| DCI | Downlink Control Information |
| DL | Downlink |
| DRX | Discontinuous Reception |
| ETWS | Earthquake and Tsunami Warning System |
| gNB | NR NodeB |
| IE | Information Element |
| LSB | Least Significant Bit |
| MAC | Medium Access Control |
| MAC-CE | MAC Control Element |
| MBS | Multimedia/Broadcast Service |
| MIMO | Multiple Input Multiple Output |
| NAS | Non-Access Stratum |
| NG-RAN | Next Generation RAN |
| NR | New Radio |
| OFDM | Orthogonal Frequency Division Multiplexing |
| PCCH | Paging Common Control Channel |
| PDCCH | Physical Downlink Control Channel |
| PDSCH | Physical Downlink Shared Channel |
| PF | Paging Frame |
| PO | Paging Occasion |
| PRB | Physical Resource Block |
| P-RNTI | Paging Radio Network Temporary Identifier |
| PWS | Public Warning System |
| RAN | Radio Access Network |

TABLE 18-continued

Abbreviations and Definitions

| Abbreviations | Definitions |
|---|---|
| REDCAP | Reduced Capability |
| RMSI | Remaining Minimum System Information |
| RNTI | Radio Network Temporary Identifier |
| RRC | Radio Resource Control |
| SCS | Sub-Carrier Spacing |
| SFN | System Frame Number |
| SI | System Information |
| SL | Sidelink |
| SIB | System Information Block |
| SSB | Synchronization Signal Block |
| S-TMSI | Shortened-Temporary Mobile Subscriber Identity |
| TB | Transport Block |
| UE | User Equipment |
| UL | Uplink |
| VRB | Virtual Resource Block |
| WUS | Wakeup Signal |

Figure 12:
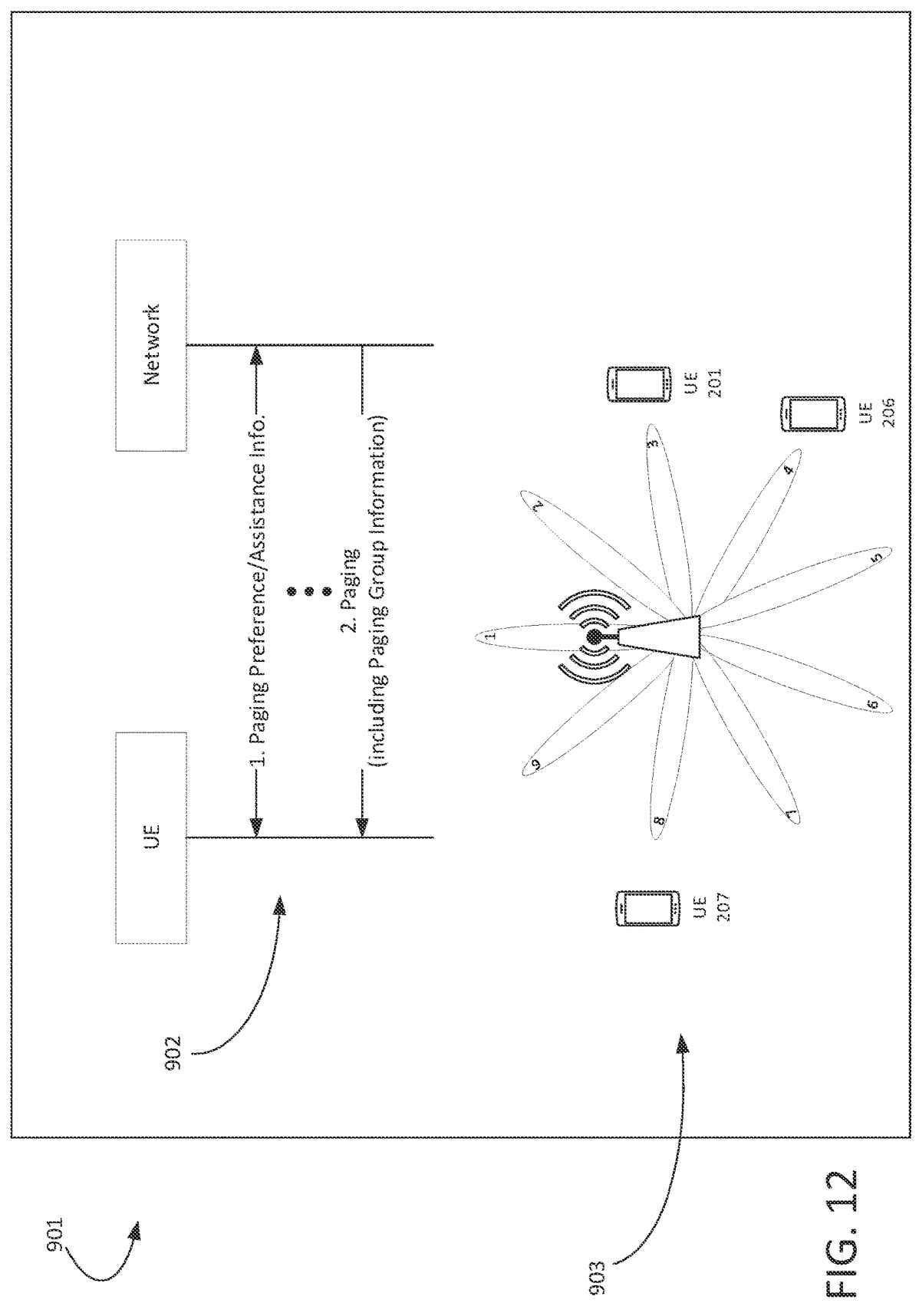
FIG. 12 illustrates an exemplary display (e.g., graphical user interface) that may be generated based on the methods, systems, and devices of paging enhancements for UE power savings.

FIG. 12 illustrates an exemplary display (e.g., graphical user interface) that may be generated based on the methods, systems, and devices of paging enhancements for UE power savings, as disclosed herein. Display interface 901 (e.g., touch screen display) may provide text in block 902 associated with paging enhancements for UE power savings, such as related parameters, method flow, and current conditions. Progress of any of the steps (e.g., sent messages or success of steps) discussed herein may be displayed in block 902. In addition, graphical output 902 may be displayed on display interface 901. Graphical output 903 may be the topology of the devices implementing the methods, systems, and devices of paging enhancements for UE power savings, a graphical output of the progress of any method or systems discussed herein, or the like.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging require-
ments. The ultra-mobile broadband is expected to include
cmWave and mmWave spectrum that will provide the oppor-
tunity for ultra-mobile broadband access for, e.g., indoor
applications and hotspots. In particular, the ultra-mobile
broadband is expected to share a common design framework
with the flexible radio access below 7 GHz, with cmWave
and mmWave specific design optimizations.

3GPP has identified a variety of use cases that NR is
expected to support, resulting in a wide variety of user
experience requirements for data rate, latency, and mobility.
The use cases include the following general categories:
enhanced mobile broadband (eMBB) ultra-reliable low-
latency Communication (URLLC), massive machine type
communications (mMTC), network operation (e.g., network
slicing, routing, migration and interworking, energy sav-
ings), and enhanced vehicle-to-everything (eV2X) commu-
nications, which may include any of Vehicle-to-Vehicle
Communication (V2V), Vehicle-to-Infrastructure Commu-
nication (V2I), Vehicle-to-Network Communication (V2N),
Vehicle-to-Pedestrian Communication (V2P), and vehicle
communications with other entities. Specific service and
applications in these categories include, e.g., monitoring and
sensor networks, device remote controlling, bi-directional
remote controlling, personal cloud computing, video stream-
ing, wireless cloud-based office, first responder connectivity,
automotive ecall, disaster alerts, real-time gaming, multi-
person video calls, autonomous driving, augmented reality,
tactile internet, virtual reality, home automation, robotics,
and aerial drones to name a few. All of these use cases and
others are contemplated herein.

Figure 13A:
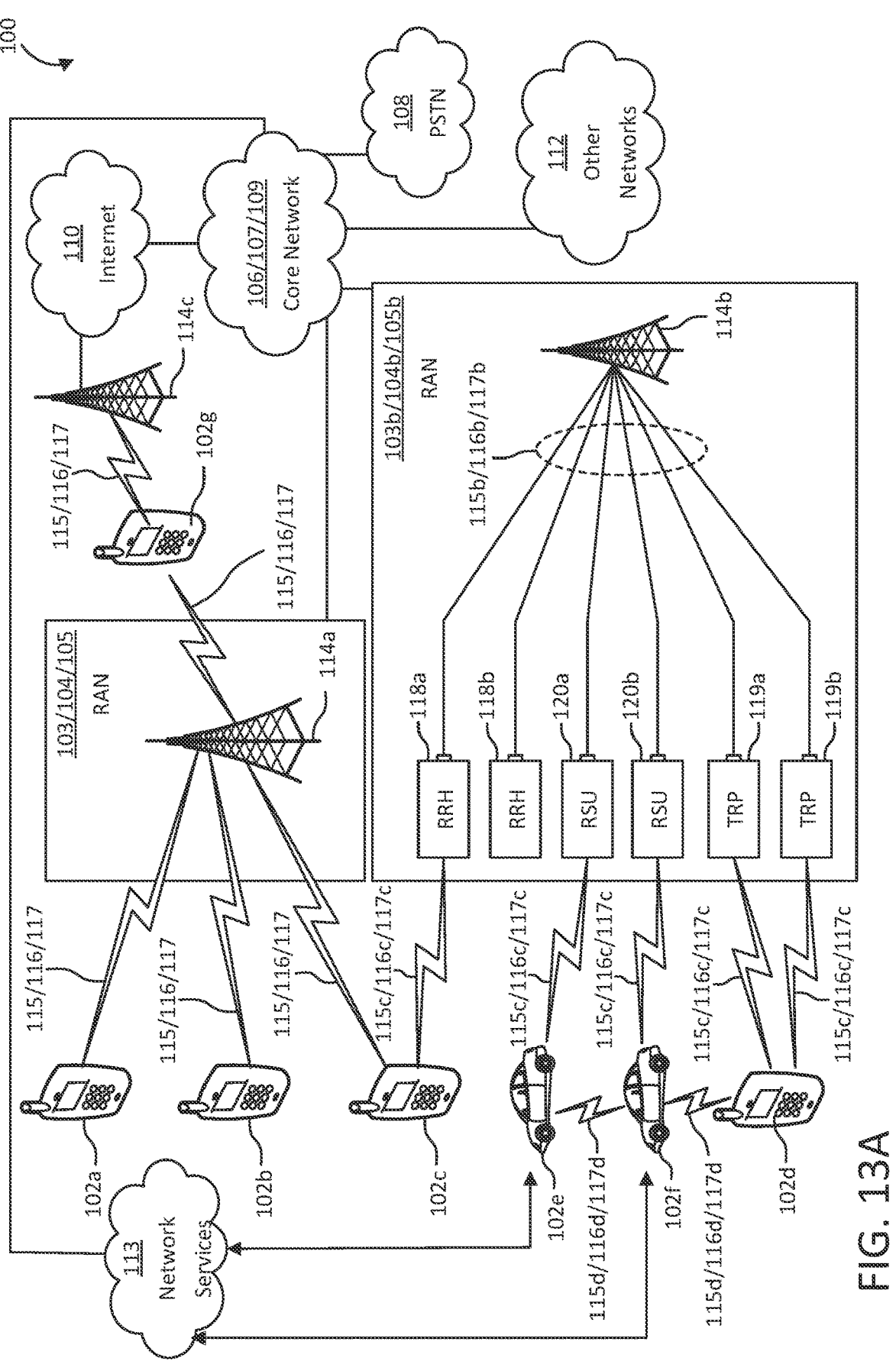
FIG. 13A illustrates an example communications system.

FIG. 13A illustrates an example communications system
100 in which the methods and apparatuses of paging
enhancements for UE power savings, such as the systems
and methods illustrated in FIG. 1 through FIG. 12 described
and claimed herein may be used. The communications
system 100 may include wireless transmit/receive units
(WTRUs) 102a, 102b, 102c, 102d, 102e, 102f, or 102g
(which generally or collectively may be referred to as
WTRU 102 or WTRUs 102). The communications system
100 may include, a radio access network (RAN) 103/104/
105/103b/104b/105b, a core network 106/107/109, a public
switched telephone network (PSTN) 108, the Internet 110,
other networks 112, and Network Services 113. Network
Services 113 may include, for example, a V2X server, V2X
functions, a ProSe server, ProSe functions, IoT services,
video streaming, or edge computing, etc.

It will be appreciated that the concepts disclosed herein
may be used with any number of WTRUs, base stations,
networks, or network elements. Each of the WTRUs 102a,
102b, 102c, 102d, 102e, 102f, or 102g may be any type of
apparatus or device configured to operate or communicate in
a wireless environment. Although each WTRU 102a, 102b,
102c, 102d, 102e, 102f, or 102g may be depicted in FIG.
13A, FIG. 13B, FIG. 13C, FIG. 13D, FIG. 13E, or FIG. 13F
as a hand-held wireless communications apparatus, it is
understood that with the wide variety of use cases contem-
plated for 5G wireless communications, each WTRU may
comprise or be embodied in any type of apparatus or device
configured to transmit or receive wireless signals, including,
by way of example only, user equipment (UE), a mobile
station, a fixed or mobile subscriber unit, a pager, a cellular
telephone, a personal digital assistant (PDA), a smartphone,
a laptop, a tablet, a netbook, a notebook computer, a
personal computer, a wireless sensor, consumer electronics,
a wearable device such as a smart watch or smart clothing, a medical or eHealth device, a robot, industrial equipment,
a drone, a vehicle such as a car, bus, truck, train, or airplane,
and the like.

The communications system 100 may also include a base
station 114a and a base station 114b. In the example of FIG.
13A, each base stations 114a and 114b is depicted as a single
element. In practice, the base stations 114a and 114b may
include any number of interconnected base stations or
network elements. Base stations 114a may be any type of
device configured to wirelessly interface with at least one of
the WTRUs 102a, 102b, and 102c to facilitate access to one
or more communication networks, such as the core network
106/107/109, the Internet 110, Network Services 113, or the
other networks 112. Similarly, base station 114b may be any
type of device configured to wiredly or wirelessly interface
with at least one of the Remote Radio Heads (RRHs) 118a,
118b, Transmission and Reception Points (TRPs) 119a,
119b, or Roadside Units (RSUs) 120a and 120b to facilitate
access to one or more communication networks, such as the
core network 106/107/109, the Internet 110, other networks
112, or Network Services 113. RRHs 118a, 118b may be any
type of device configured to wirelessly interface with at least
one of the WTRUs 102, e.g., WTRU 102c, to facilitate
access to one or more communication networks, such as the
core network 106/107/109, the Internet 110, Network Ser-
vices 113, or other networks 112

TRPs 119a, 119b may be any type of device configured to
wirelessly interface with at least one of the WTRU 102d, to
facilitate access to one or more communication networks,
such as the core network 106/107/109, the Internet 110,
Network Services 113, or other networks 112. RSUs 120a
and 120b may be any type of device configured to wirelessly
interface with at least one of the WTRU 102e or 102f, to
facilitate access to one or more communication networks,
such as the core network 106/107/109, the Internet 110,
other networks 112, or Network Services 113. By way of
example, the base stations 114a, 114b may be a Base
Transceiver Station (BTS), a Node-B, an eNode B, a Home
Node B, a Home eNode B, a Next Generation Node-B
(gNode B), a satellite, a site controller, an access point (AP),
a wireless router, and the like.

The base station 114a may be part of the RAN 103/104/
105, which may also include other base stations or network
elements (not shown), such as a Base Station Controller
(BSC), a Radio Network Controller (RNC), relay nodes, etc.
Similarly, the base station 114b may be part of the RAN
103b/104b/105b, which may also include other base stations
or network elements (not shown), such as a BSC, a RNC,
relay nodes, etc. The base station 114a may be configured to
transmit or receive wireless signals within a particular
geographic region, which may be referred to as a cell (not
shown). Similarly, the base station 114b may be configured
to transmit or receive wired or wireless signals within a
particular geographic region, which may be referred to as a
cell (not shown) for methods, systems, and devices of
paging enhancements for UE power savings, as disclosed
herein. Similarly, the base station 114b may be configured to
transmit or receive wired or wireless signals within a par-
ticular geographic region, which may be referred to as a cell
(not shown). The cell may further be divided into cell
sectors. For example, the cell associated with the base
station 114a may be divided into three sectors. Thus, in an
example, the base station 114a may include three transceiv-
ers, e.g., one for each sector of the cell. In an example, the
base station 114a may employ multiple-input multiple out-
put (MIMO) technology and, therefore, may utilize multiple
transceivers for each sector of the cell.

The base stations 114a may communicate with one or more of the WTRUs 102a, 102b, 102c, or 102g over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, or RSUs 120a, 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, or 102f may communicate with one another over an air interface 115d/116d/117d, such as Sidelink communication, which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114a and the WTRUs 102a, 102b, 102c, or RRHs 118a, 118b, TRPs 119a, 119b, or RSUs 120a, 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) or LTE-Advanced (LTE-A). In the future, the air interface 115/116/117 or 115c/116c/117c may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 114a in the RAN 103/104/105 and the WTRUs 102a, 102b, 102c, and 102g or RRHs 118a, 118b, TRPs 119a, 119b or RSUs 120a, 120b in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 13A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like, for implementing the methods, systems, and devices of paging enhancements for UE power savings, as disclosed herein. In an example, the base station 114c and the WTRUs 102, e.g., WTRU 102e, may implement a radio technology such as IEEE 802.11 to establish a wireless local area network (WLAN), similarly, the base station 114c and the WTRUs 102d, may implement a radio technology such as IEEE 802.15 to establish a wireless personal area network (WPAN). In yet another example, the base station 114c and the WTRUs 102, e.g., WTRU 102e, may utilize a cellular-based RAT (e.g., WCDMA, CDMA2000, GSM, LTE, LTE-A, NR, etc.) to establish a picocell or femtocell. As shown in FIG. 13A, the base station 114c may have a direct connection to the Internet 110. Thus, the base station 114c may not be required to access the Internet 110 via the core network 106/107/109.

The RAN 103/104/105 or RAN 103b/104b/105b may be in communication with the core network 106/107/109, which may be any type of network configured to provide voice, data, messaging, authorization and authentication, applications, or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 13A, it will be appreciated that the RAN 103/104/105 or RAN 103b/104b/105b or the core network 106/107/109 may be in direct or indirect communication with other RANs that employ the same RAT as the RAN 103/104/105 or RAN 103b/104b/105b or a different RAT. For example, in addition to being connected to the RAN 103/104/105 or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102a, 102b, 102c, 102d, 102e to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include any type of packet data network (e.g., an IEEE 802.3 Ethernet network) or another core network connected to one or more RANs, which may employ the same RAT as the RAN 103/104/105 or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links for implementing methods, systems, and devices of paging enhancements for UE power savings, as disclosed herein. For example, the WTRU 102g shown in FIG. 13A may be configured to communicate with the base station 114a, which may employ a cellular-based radio technology, and with the base station 114c, which may employ an IEEE 802 radio technology.

Although not shown in FIG. 13A, it will be appreciated that a User Equipment may make a wired connection to a gateway. The gateway may be a Residential Gateway (RG). The RG may provide connectivity to a Core Network 106/107/109. It will be appreciated that much of the subject matter included herein may equally apply to UEs that are WTRUs and UEs that use a wired connection to connect with a network. For example, the subject matter that applies to the wireless interfaces 115, 116, 117 and 115c/116c/117c may equally apply to a wired connection.

Figure 13B:
FIG. 13B illustrates an exemplary system that includes RANs and core networks.

FIG. 13B is a system diagram of an example RAN 103 and core network 106 that may implement methods, systems, and devices of paging enhancements for UE power savings, as disclosed herein. As noted above, the RAN 103 may employ a UTRA radio technology to communicate with the WTRUs 102a, 102b, and 102c over the air interface 115. The RAN 103 may also be in communication with the core network 106. As shown in FIG. 13B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 13B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 13B may include a media gateway (MGW) 144, a Mobile Switching Center (MSC) 146, a Serving GPRS Support Node (SGSN) 148, or a Gateway GPRS Support Node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned or operated by other service providers.

Figure 13C:
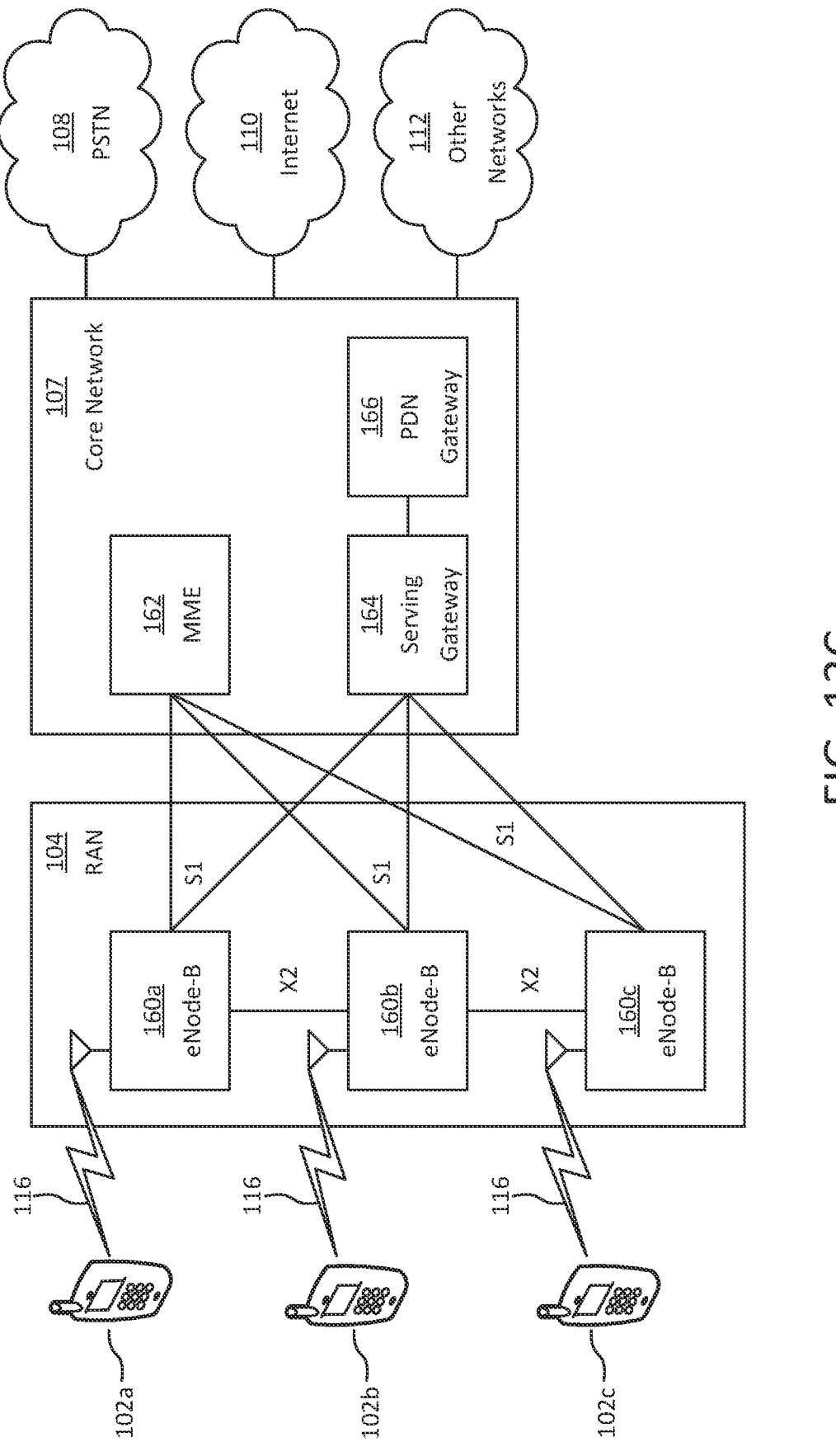
FIG. 13C illustrates an exemplary system that includes RANs and core networks.

FIG. 13C is a system diagram of an example RAN 104 and core network 107 that may implement methods, systems, and devices paging enhancements for UE power savings, as disclosed herein. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink or downlink, and the like. As shown in FIG. 13C, the eNode-Bs 160a, 160b, and 160c may communicate with one another over an X2 interface.

The core network 107 shown in FIG. 13C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160a, 160b, and 160c in the RAN 104 via an Si interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the Si interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned or operated by other service providers.

Figure 13D:
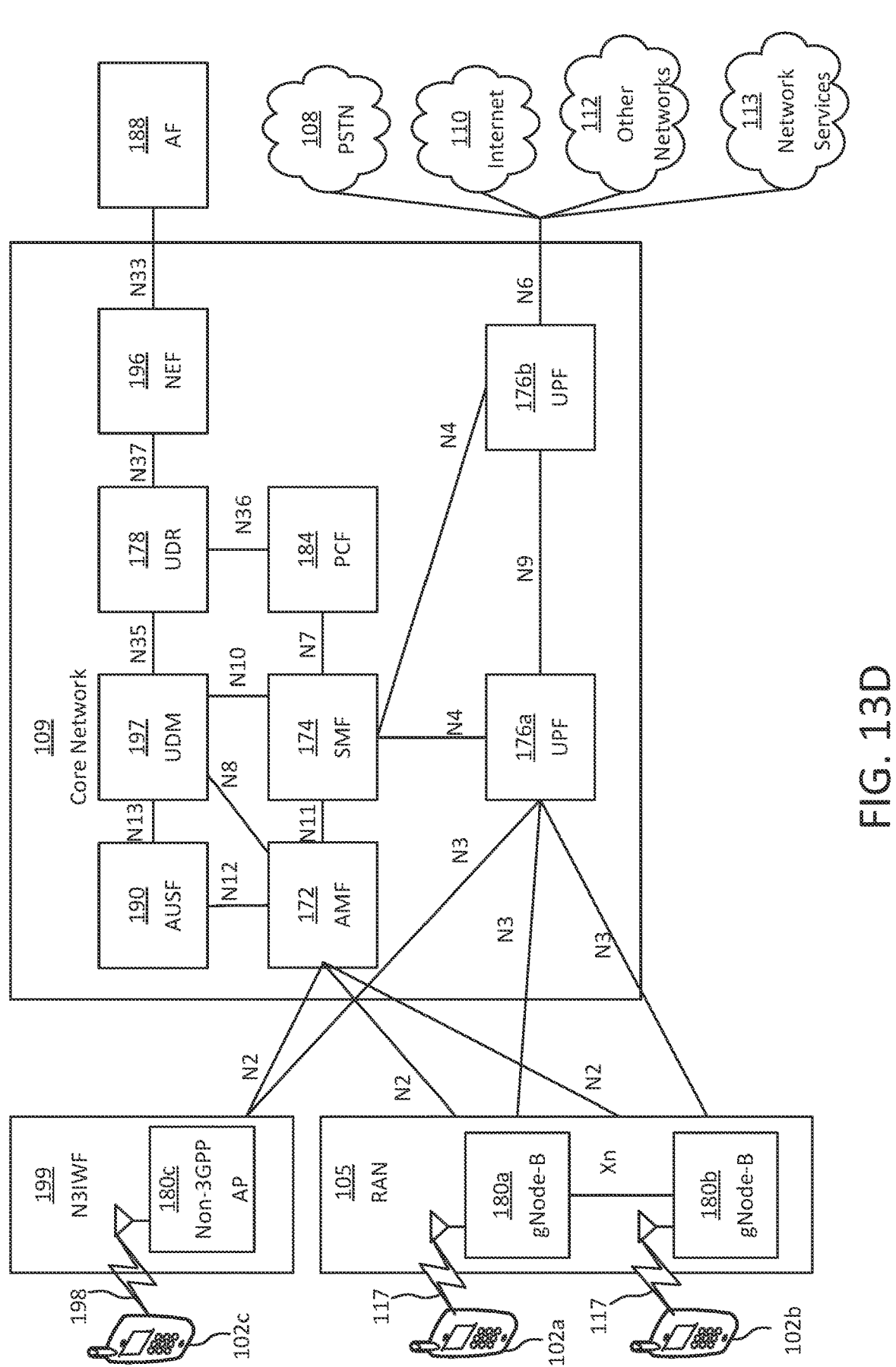
FIG. 13D illustrates an exemplary system that includes RANs and core networks.

FIG. 13D is a system diagram of an example RAN 105 and core network 109 that may implement methods, systems, and devices of paging enhancements for UE power savings, as disclosed herein. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink or downlink, and the like. As shown in FIG. 13D, the gNode-Bs 180a and 180b may communicate with one another over an Xn interface, for example.

The core network 109 shown in FIG. 13D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in FIG. 13G.

In the example of FIG. 13D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned or operated by an entity other than the core network operator. It will also be appreciated that a 5G core network may not consist of all of these elements, may consist of additional elements, and may consist of multiple instances of each of these elements. FIG. 13D shows that network functions directly connect with one another, however, it should be appreciated that they may communicate via routing agents such as a diameter routing agent or message buses.

In the example of FIG. 13D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 13D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 13D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect with network functions, so that network function can add to, read from, and modify the data that is in the repository. For example, the UDR 178 may connect with the PCF 184 via an N36 interface. Similarly, the UDR 178 may connect with the NEF 196 via an N37 interface, and the UDR 178 may connect with the UDM 197 via an N35 interface.

The UDM 197 may serve as an interface between the UDR 178 and other network functions. The UDM 197 may authorize network functions to access of the UDR 178. For example, the UDM 197 may connect with the AMF 172 via an N8 interface, the UDM 197 may connect with the SMF 174 via an N10 interface. Similarly, the UDM 197 may connect with the AUSF 190 via an N13 interface. The UDR 178 and UDM 197 may be tightly integrated.

The AUSF 190 performs authentication related operations and connect with the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect with an AF 188 via an N33 interface and it may connect with other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 13D, in a network slicing scenario, a WTRU 102a, 102b, or 102c may connect with an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned or operated by other service providers.

The core network entities described herein and illustrated in FIG. 13A, FIG. 13C, FIG. 13D, or FIG. 13E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 13A, FIG. 13B, FIG. 13C, FIG. 13D, or FIG. 13E are provided by way of example only, and it is understood that the subject matter disclosed and claimed herein may be embodied or implemented in any similar communication system, whether presently defined or defined in the future.

Figure 13E:
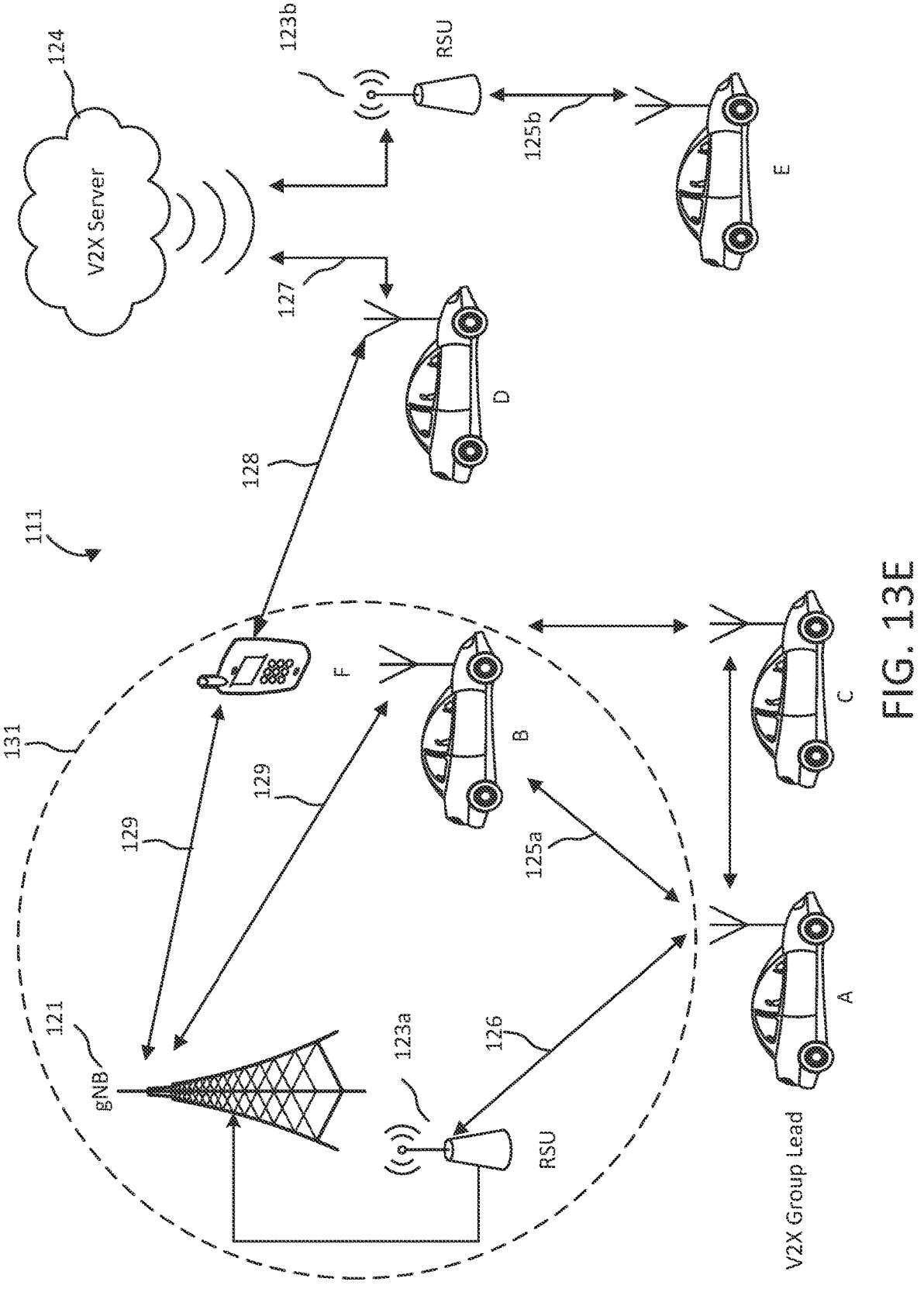
FIG. 13E illustrates another example communications system.

FIG. 13E illustrates an example communications system 111 in which the systems, methods, apparatuses that implement paging enhancements for UE power savings, described herein, may be used. Communications system 111 may include Wireless Transmit/Receive Units (WTRUs) A, B, C, D, E, F, a base station gNB 121, a V2X server 124, and Road Side Units (RSUs) 123*a* and 123*b*. In practice, the concepts presented herein may be applied to any number of WTRUs, base station gNBs, V2X networks, or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 13E, WTRUs B and F are shown within access network coverage 131. WTRUs A, B, C, D, E, and F may communicate with each other directly via a Sidelink interface (e.g., PC5 or NR PC5) such as interface 125*a*, 125*b*, or 128, whether they are under the access network coverage 131 or out of the access network coverage 131. For instance, in the example of FIG. 13E, WRTU D, which is outside of the access network coverage 131, communicates with WTRU F, which is inside the coverage 131.

WTRUs A, B, C, D, E, and F may communicate with RSU 123*a* or 123*b* via a Vehicle-to-Network (V2N) 133 or Sidelink interface 125*b*. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 13F:
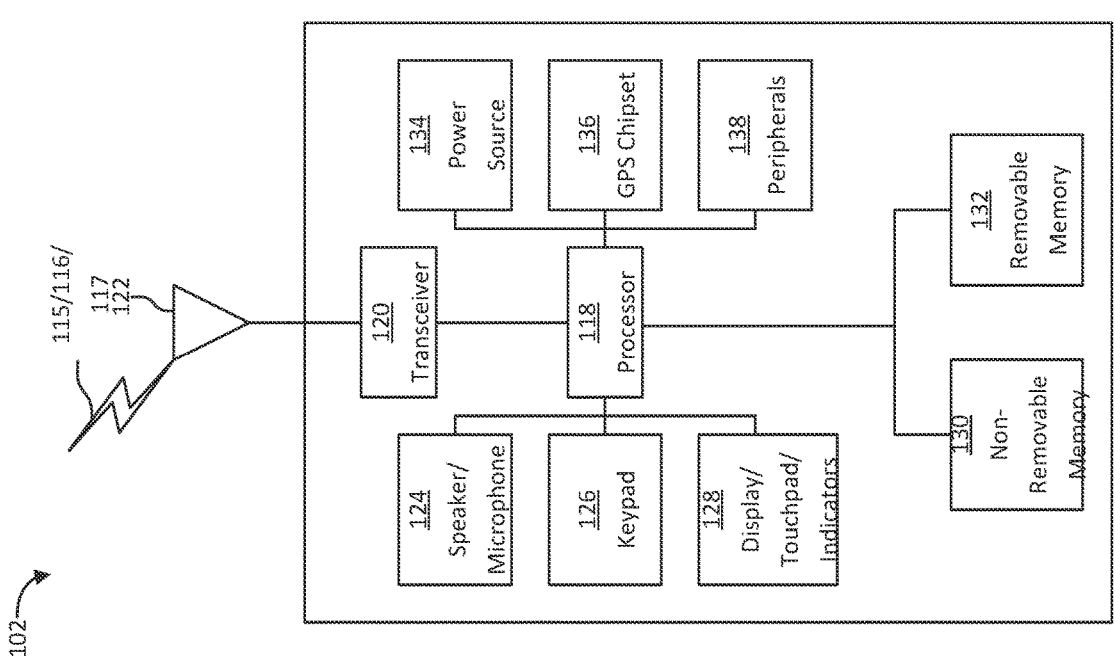
FIG. 13F is a block diagram of an example apparatus or device, such as a WTRU.

FIG. 13F is a block diagram of an example apparatus or device WTRU 102 that may be configured for wireless communications and operations in accordance with the systems, methods, and apparatuses that implement paging enhancements for UE power savings, described herein, such as a WTRU 102 of FIG. 13A, FIG. 13B, FIG. 13C, FIG. 13D, FIG. 13E, FIG. 10, FIG. 11, or the like. As shown in FIG. 13F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any subcombination of the foregoing elements. Also, the base stations 114*a* and 114*b*, or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 13F and may be an exemplary implementation that performs the disclosed systems and methods for device paging enhancements for UE power savings described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 13F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114*a* of FIG. 13A) over the air interface 115/116/117 or another UE over the air interface 115*d*/116*d*/117*d*. For example, the transmit/receive element 122 may be an antenna configured to transmit or receive RF signals. The transmit/receive element 122 may be an emitter/detector configured to transmit or receive IR, UV, or visible light signals, for example. The transmit/receive element 122 may be configured to transmit and receive both RF and light signals. It will be appreciated that the transmit/receive element 122 may be configured to transmit or receive any combination of wireless or wired signals.

In addition, although the transmit/receive element 122 is depicted in FIG. 13F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED) display unit. The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown). The processor 118 may be configured to control lighting patterns, images, or colors on the display or indicators 128 in response to whether the setup of the paging enhancements for UE power savings in some of the examples described herein are successful or unsuccessful, or otherwise indicate a status of paging enhancements for UE power savings and associated components. The control lighting patterns, images, or colors on the display or indicators 128 may be reflective of the status of any of the method flows or components in the FIG.'s illustrated or discussed herein (e.g., FIG. 1-FIG. 12, etc.). Disclosed herein are messages and procedures of paging enhancements for UE power savings. The messages and procedures may be extended to provide interface/API for users to request resources via an input source (e.g., speaker/microphone 124, keypad 126, or display/touchpad/indicators 128) and request, configure, or query paging enhancements for UE power savings related information, among other things that may be displayed on display 128.

The processor 118 may receive power from the power source 134 and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software or hardware modules that provide additional features, functionality, or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect with other components, modules, or systems of such apparatuses or devices via one or more interconnect interfaces, such as an interconnect interface that may comprise one of the peripherals 138.

Figure 13G:
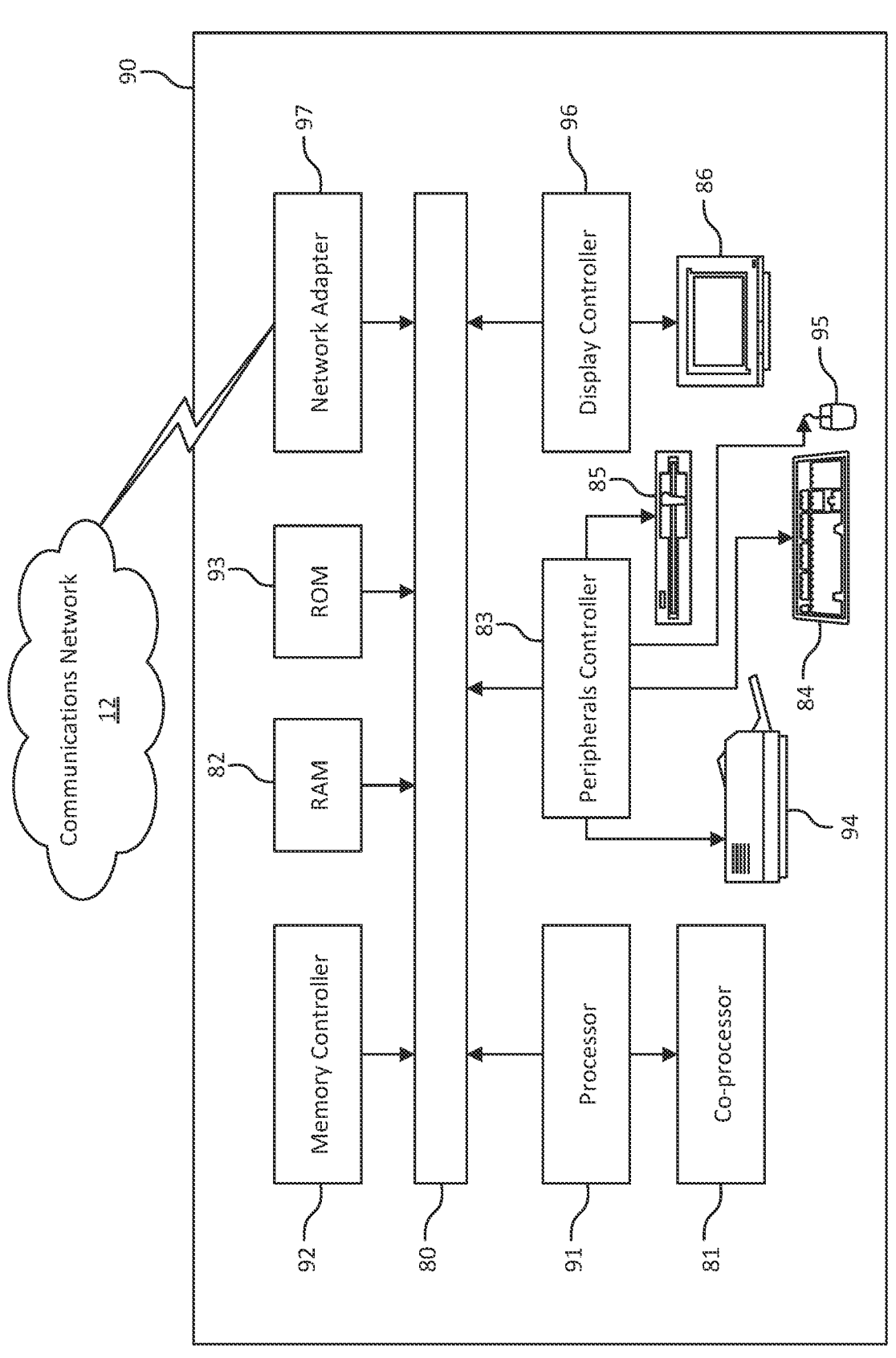
FIG. 13G is a block diagram of an exemplary computing system.

FIG. 13G is a block diagram of an exemplary computing system 90 in which one or more apparatuses of the communications networks illustrated in FIG. 13A, FIG. 13C, FIG. 13D and FIG. 13E as well as paging enhancements for UE power savings, such as the systems and methods illustrated in FIG. 1 through FIG. 12 described and claimed herein may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for paging enhancements for UE power savings, such as receiving, processing, or sending messages.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally include stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may include peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIG. 13A, FIG. 13B, FIG. 13C, FIG. 13D, or FIG. 13E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—paging enhancements for UE power savings—as illustrated in the FIG.s, specific terminology is employed for the sake of clarity. The claimed subject matter, however, is not intended to be limited to the specific terminology so selected.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples for the disclosed subject matter, including the best mode, and also to enable any person skilled in the art to practice the disclosed subject matter, including making and using any devices or systems and performing any incorporated methods. The disclosed subject matter may include other examples that occur to those skilled in the art (e.g., skipping steps, combining steps, or adding steps between exemplary methods disclosed herein).

Methods, systems, and apparatuses, among other things, as described herein may provide for paging enhancements for UE power savings. A method, system, computer readable storage medium, or apparatus provides for determining a PO to monitor for paging; determining a paging group associated with the device; and monitoring for paging of the determined paging group during the determined PO. All combinations in this paragraph (including the removal or addition of steps) are contemplated in a manner that is consistent with the other portions of the detailed description.

What is claimed:

1. A wireless transmit/receive unit (WTRU) comprising: a processor; and memory coupled with the processor, the memory comprising executable instructions stored thereon that when executed by the processor cause the processor to effectuate operations comprising:

transmit assistance information to a core network device using non-access stratum (NAS) signaling;

receive, from the core network device, a NAS message that comprises a paging group identifier for a paging group to which the WTRU belongs;

transition into one or more states comprising a radio resource control (RRC) idle state or an RRC inactive state;

receive, from a base station, a wake-up signal (WUS) that comprises the paging group identifier, when the WTRU is in the one or more states that comprise the RRC idle state or the RRC inactive state;

based on receiving the paging group identifier in the WUS, determine to monitor a subsequent paging occasion (PO) and monitor the subsequent PO based on the determination;

based on the monitoring, receive a paging message carried on a physical downlink shared channel (PDSCH), the paging message including one or more paging records; and respond to the paging message based on a determination that an identifier of the WTRU matches a paging record among the one or more paging records.

2. The WTRU of claim 1, wherein the core network device comprises an access and mobility management function (AMF).

3. The WTRU of claim 1, wherein the paging group identifier is determined by the core network.

4. The WTRU of claim 1, further configured to: receive a first paging group identifier for use in an RRC idle state and a second paging group identifier for use in an RRC inactive state.

5. The WTRU of claim 1, wherein the paging group identifier is determined based on one or more of: a WTRU type, a release of the WTRU, or a power consumption profile of the WTRU.

6. The WTRU of claim 1, wherein the paging group identifier is determined based on one or more of: a battery level of the WTRU, a traffic profile, or a mobility state of the WTRU.

7. A method comprising:

transmitting assistance information using non-access stratum (NAS) signaling;

receiving a NAS message that comprises a paging group identifier for a paging group to which a wireless transmit receive unit (WTRU) belongs;

transitioning into one or more states comprising a radio resource control (RRC) idle state or an RRC inactive state;

receiving a wake-up signal (WUS) that comprises the paging group identifier, when the WTRU is in the one or more states that comprise the RRC idle state or the RRC inactive state;

based on receiving the paging group identifier in the WUS, determining to monitor a subsequent paging occasion (PO) and monitoring the subsequent PO based on the determination;

based on the monitoring, receiving a paging message carried on a physical downlink shared channel (PDSCH), the paging message including one or more paging records; and responding to the paging message based on a determination that an identifier of the WTRU matches a paging record among the one or more paging records.

8. The method of claim 7, wherein the NAS message that comprises the paging group identifier is from a core network device.

9. The method of claim 8, wherein the paging group identifier is determined by the core network.

10. The method of claim 7, further comprising: receiving a first paging group identifier for use in an RRC idle state and a second paging group identifier for use in an RRC inactive state.

11. The method of claim 7, wherein the paging group identifier is determined based on a WTRU type.

12. The method of claim 7, wherein the paging group identifier is determined based on one or more of: a battery level of the WTRU or a mobility state of the WTRU.

13. The method of claim 7, wherein the paging group identifier is determined based on one or more of: a release of the WTRU or a power consumption profile of the WTRU.

14. The method of claim 7, wherein the paging group identifier is determined based on a traffic profile.

15. A system comprising:

one or more processors; and one or more memory coupled with the processor, the one or more memory comprising executable instructions stored thereon that when executed by the one or more processors cause the one or more processors to effectuate operations comprising:

receive assistance information at a core network device using non-access stratum (NAS) signaling;

in response to receiving of the assistance information, transmit, from the core network device, an NAS message that comprises a paging group identifier for a paging group to which a wireless transmit/receive unit (WTRU) belongs, wherein the WTRU transitions into one or more states comprising a radio resource control (RRC) idle state or an RRC inactive state;

receive, at the WTRU, a wake-up signal (WUS) from a base station that comprises the paging group identifier, when the WTRU is in the one or more states that comprise the RRC idle state or the RRC inactive state;

based on receiving the paging group identifier in the WUS, determine at the WTRU to monitor a subsequent paging occasion (PO) and monitor the subsequent PO based on the determination;

based on the monitoring, receive, at the WTRU, a paging message carried on a physical downlink shared channel (PDSCH), the paging message including one or more paging records; and respond, by the WTU, to the paging message based on a determination that an identifier of the WTRU matches a paging record among the one or more paging records.

16. The system of claim 15, wherein the core network device comprises an access and mobility management function (AMF).

17. The system of claim 15, wherein the paging group identifier is determined by the core network.

18. The system of claim 15, wherein the paging group identifier is determined based on a battery level of the WTRU.

* * * * *